(12) United States Patent
Morita

(10) Patent No.: US 9,154,745 B2
(45) Date of Patent: Oct. 6, 2015

(54) ENDSCOPE APPARATUS AND PROGRAM

(75) Inventor: Yasunori Morita, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 990 days.

(21) Appl. No.: 13/289,149

(22) Filed: Nov. 4, 2011

(65) Prior Publication Data
US 2012/0120216 A1 May 17, 2012

(30) Foreign Application Priority Data

Nov. 11, 2010 (JP) ................................ 2010-252555

(51) Int. Cl.
A61B 1/00 (2006.01)
H04N 7/18 (2006.01)
G02B 23/24 (2006.01)
G02B 26/00 (2006.01)

(52) U.S. Cl.
CPC ............ H04N 7/183 (2013.01); G02B 23/2469 (2013.01); G02B 23/2476 (2013.01); G02B 26/008 (2013.01)

(58) Field of Classification Search
CPC ........................................................ A61B 1/00
USPC ........................................................ 348/65
See application file for complete search history.

(56) References Cited

U.S. PATENT DOCUMENTS

2005/0248655 A1* 11/2005 Kitamura et al. ............. 348/187
2007/0195425 A1* 8/2007 Arai ............................... 359/687
2009/0051775 A1* 2/2009 Takahashi .................. 348/208.4
2011/0090362 A1* 4/2011 Yanagita et al. ........... 348/222.1

FOREIGN PATENT DOCUMENTS

JP          2003-305005 A      10/2003
WO          2010/100677 A1      9/2010
WO          WO 2010100677 A1 *  9/2010

OTHER PUBLICATIONS

Japanese Office Action dated Mar. 18, 2014 from related Japanese Application No. 2010-252555, together with an English language translation.

* cited by examiner

Primary Examiner — Sath V Perungavoor
Assistant Examiner — Jeffery Williams
(74) Attorney, Agent, or Firm — Scully, Scott, Murphy & Presser, P.C.

(57) ABSTRACT

An endoscope apparatus includes an image acquisition section that acquires images in time series, a coefficient calculation section that calculates a correction coefficient for correcting blurring in a depth direction that is a direction along an optical axis of an imaging section, and a depth-direction blurring correction section that performs a depth-direction blurring correction process that corrects blurring in the depth direction on the images acquired in time series based on the correction coefficient.

16 Claims, 17 Drawing Sheets

TIME t-1

TIME t

FIG. 7

| f(t-1) | f(t) | | | |
|---|---|---|---|---|
| FEATURE POINT | FEATURE POINT | MOTION VECTOR | FEATURE POINT AFTER DEPTH-DIRECTION BLURRING CORRECTION PROCESS | MOTION VECTOR AFTER DEPTH-DIRECTION BLURRING CORRECTION PROCESS |
| P1'(x1',y1') | P1(x1,y1) | P1-P1' | Mag·P1 | Mag·P1-P1' |
| P2'(x2',y2') | P2(x2,y2) | P2-P2' | Mag·P2 | Mag·P2-P2' |
| P3'(x3',y3') | P3(x3,y3) | P3-P3' | Mag·P3 | Mag·P3-P3' |

ENDSCOPE APPARATUS AND PROGRAM

Japanese Patent Application No. 2010-252555 filed on Nov. 11, 2010, is hereby incorporated by reference in its entirety.

BACKGROUND

The present invention relates to an endoscope apparatus, a program, and the like.

In recent years, differential diagnosis has been performed using an endoscope apparatus by observing the object in a magnified state. An optical zoom process that does not cause a deterioration in the object image is generally used for magnifying observation. An electronic zoom process performed on image data acquired by a CCD or the like can further magnify the object image subjected to the optical zoom process.

For example, JP-A-5-49599 discloses a method that performs a blurring correction process by detecting the motion of the end of the scope when using an endoscope apparatus that implements magnifying observation. According to this method, a moving amount detection means that detects the direction and the angular velocity is provided in the curved section of the endoscope, and the blurring correction process is performed based on the moving direction and the moving distance.

JP-A-2009-71380 discloses a method that detects the motion amount of the object, and stops the moving image at an appropriate timing by detecting a freeze instruction signal to acquire a still image. According to this method, an optimum frozen image with a small amount of blurring is generated by detecting the periodicity of the image.

SUMMARY

According to one aspect of the invention, there is provided an endoscope apparatus comprising:

an image acquisition section that acquires images in time series;

a coefficient calculation section that calculates a correction coefficient for correcting blurring in a depth direction that is a direction along an optical axis of an imaging section; and a depth-direction blurring correction section that performs a depth-direction blurring correction process on the images acquired in time series based on the correction coefficient, the depth-direction blurring correction process being a process that corrects blurring in the depth direction.

According to another aspect of the invention, there is provided an information storage medium storing a program that causes a computer to function as:

an image acquisition section that acquires images in time series;

a coefficient calculation section that calculates a correction coefficient for correcting blurring in a depth direction that is a direction along an optical axis of an imaging section; and a depth-direction blurring correction section that performs a depth-direction blurring correction process on the images acquired in time series based on the correction coefficient, the depth-direction blurring correction process being a process that corrects blurring in the depth direction.

BRIEF DESCRIPTION OF THE DRAWINGS

FIG. 7 shows an example of feature point data used for a blurring correction process.

DESCRIPTION OF EXEMPLARY EMBODIMENTS

When implementing magnifying observation, the effects of blurring increase as the magnification increases. For example, when using an endoscope apparatus that observes an object inside the body cavity, the internal organs such as the gullet make a motion due to the heartbeat. Therefore, blurring of the object occurs in the depth direction, so that the observation capability (e.g., visibility) deteriorates.

Several aspects of the invention may provide an endoscope apparatus, a program, and the like that can suppress blurring of a moving image in the depth direction.

According to one embodiment of the invention, there is provided an endoscope apparatus comprising:

an image acquisition section that acquires images in time series;

a coefficient calculation section that calculates a correction coefficient for correcting blurring in a depth direction that is a direction along an optical axis of an imaging section; and a depth-direction blurring correction section that performs a depth-direction blurring correction process on the images acquired in time series based on the correction coefficient, the depth-direction blurring correction process being a process that corrects blurring in the depth direction.

According to one aspect of the invention, images are acquired in time series, the correction coefficient for correcting blurring in the depth direction is calculated, and the process that corrects blurring in the depth direction is performed on the images acquired in time series based on the correction coefficient. This makes it possible to suppress blurring of a moving image in the depth direction.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Method

An outline of a depth-direction blur correction process according to one embodiment of the invention is described below. When the doctor has inserted an endoscope end into the digestive tract, the doctor searches (screens) a lesion by moving the end of the endoscope. When the doctor has found a lesion area, the doctor magnifies the object using an optical zoom process or an electronic zoom process, and observes the lesion area without moving the end of the endoscope.

Figure 1:
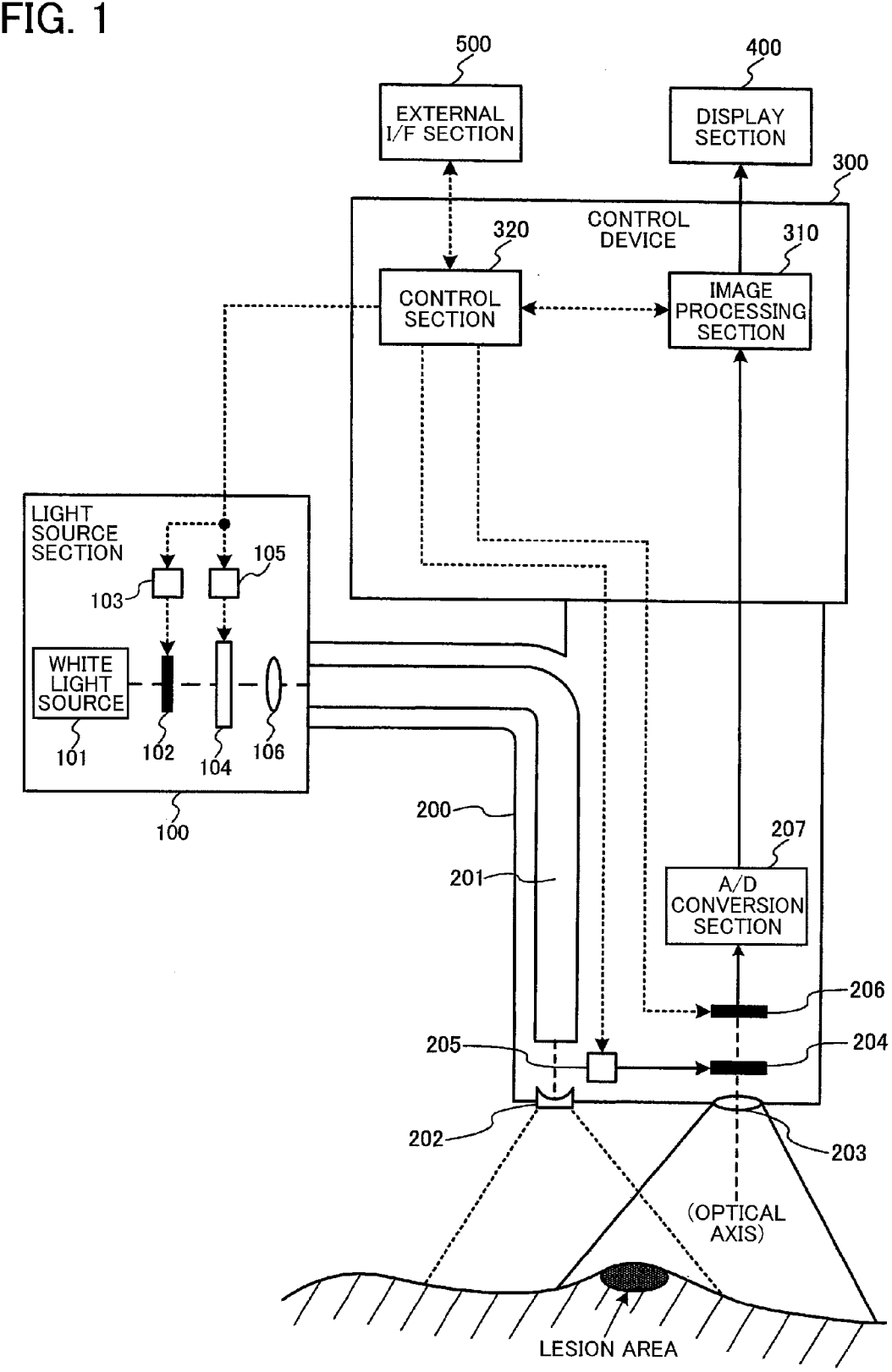
FIG. 1 shows a configuration example of an endoscope apparatus.

In this case, blurring of the object image may occur due to the motion of the object and the motion of the imaging section. As shown in FIG. 1, such blurring includes blurring in the optical axis direction of an imaging section 200, and blurring in the optical axis direction is observed as blurring in the depth direction of the image. Blurring in the depth direction occurs due to the motion of the internal organs caused by the heartbeat and the peristaltic motion of the digestive tract, for example. Since the amount of blurring of the object image increases depending on the magnification employed during magnifying observation, the amount of blurring of a moving image increases as the magnification increases.

Figure 6A:
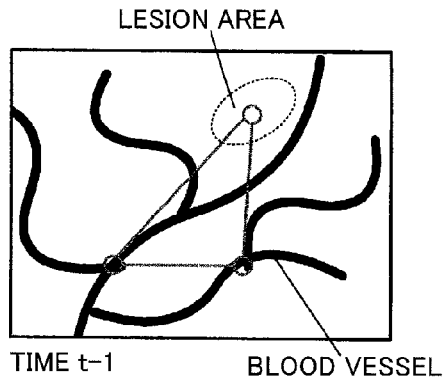
FIGS. 6A to 6G are views illustrative of a blurring correction process.
Figure 6B:
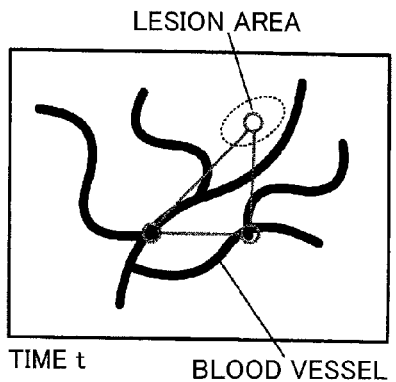
Figure 6C:
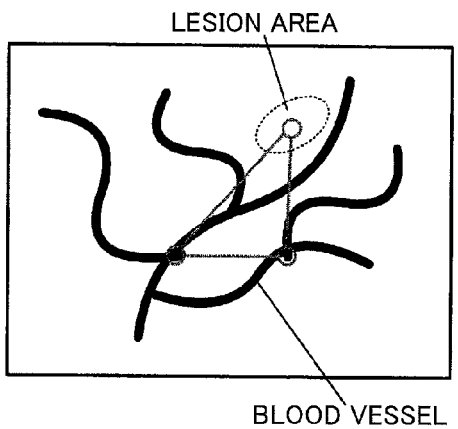

In one embodiment of the invention, the electronic zoom or optical zoom magnification is adjusted corresponding to a change in magnification of images acquired in time series (see FIGS. 6A and 6B) so that the size of the object within the images acquired in time series is constant (see FIG. 6C). This makes it possible to reduce the amount of blurring of the moving image in the depth direction due to the motion of the internal organs, so that the visibility of the moving image can be improved.

2. First Configuration Example of Endoscope Apparatus

FIG. 1 shows a first configuration example of an endoscope apparatus that corrects blurring in the depth direction. The endoscope apparatus (endoscope system) includes a light source section 100, an imaging section 200, a control device 300 (processor section in a narrow sense), a display section 400, and an external I/F section 500.

The light source section 100 emits illumination light that illuminates an object. The light source section 100 includes a white light source 101, a light source aperture 102, and a light source aperture driver section 103 that drives the light source aperture 102. The light source section 100 also includes a rotary color filter 104 that has a plurality of spectral transmittances, a rotation driver section 105 that drives the rotary color filter 104, and a condenser lens 106 that focuses light having spectral characteristics due to the rotary color filter 104 on an incident end face of a light guide fiber 201.

The light source aperture driver section 103 adjusts the intensity of light by opening or closing the light source aperture 102 based on a control signal output from a control section 320 included in the control device 300.

Figure 2:
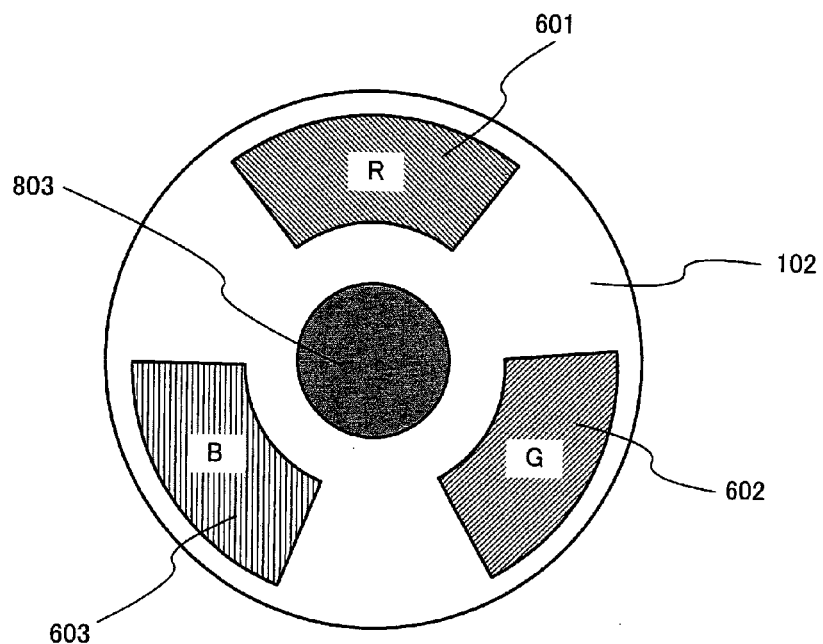
FIG. 2 shows a specific configuration example of a rotary color filter.
Figure 3:
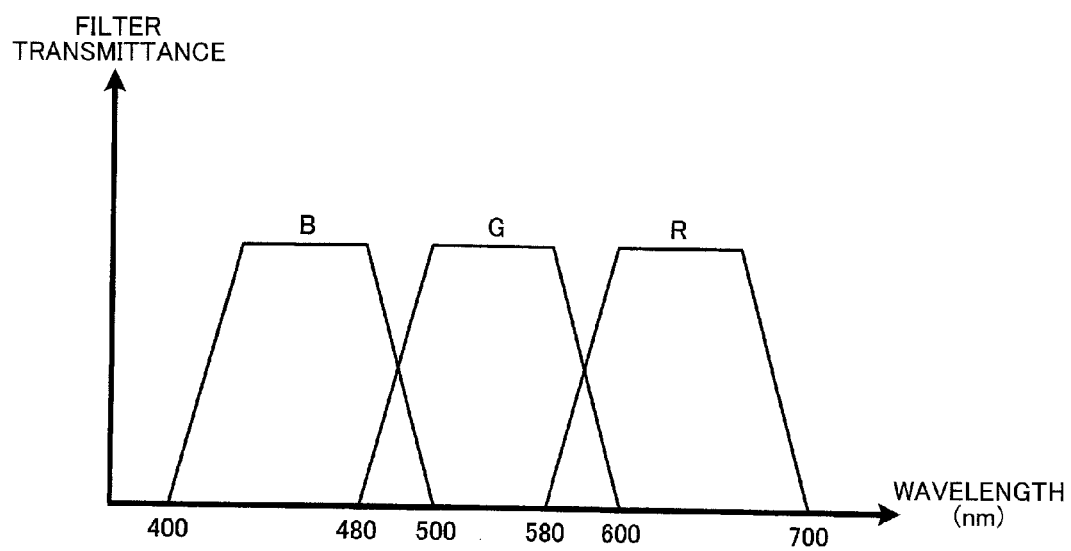
FIG. 3 shows the spectral characteristics of a color filter.

As shown in FIG. 2, the rotary color filter 104 includes a red color filter 601, a green color filter 602, a blue color filter 603, and a rotary motor 803. The color filters 601 to 603 have spectral characteristics shown in FIG. 3, for example.

The rotation driver section 105 rotates the rotary color filter 104 at a given rotational speed in synchronization with an imaging period of an imaging element 206 based on a control signal output from the control section 302 included in the control device 300. For example, when rotating the rotary color filter 104 at 20 rotations per second, the color filters 601 to 603 cross incident white light every 1/60th of a second. Therefore, the imaging element 206 completes acquisition and transfer of an image of reflected light in each color (R, G, or B) every 1/60th of a second. The imaging element 206 is a monochrome imaging element, for example. In this case, an R image, a G image, and a B image are frame-sequentially acquired (captured) every 1/60th of a second.

The imaging section 200 is formed to be elongated and flexible (i.e., can be curved) so that the imaging section 200 can be inserted into a body cavity or the like. The imaging section 200 includes the light guide fiber 201 that guides light focused by the light source section 100, and an illumination lens 202 that diffuses light guided by the light guide fiber 201, and illuminates the object. The imaging section 200 also includes an objective lens 203 that focuses reflected light from the object, a variable aperture 204, and an objective aperture driver section 205 that opens or closes the variable aperture 204 under control of the control section 320. The imaging section 200 also includes an imaging element 206 for detecting the focused reflected light, and an A/D conversion section 207 that converts an analog signal obtained by a photoelectric conversion process performed by the imaging element 206 into a digital signal. The imaging element 206 is a single monochrome imaging element, for example. The imaging element 206 may be implemented by a CCD or a CMOS sensor.

The control device 300 controls each element of the endoscope apparatus, and performs image processing. The control device 300 includes an image processing section 310 and the control section 320.

An image (image signal) converted into digital data by the A/D conversion section 207 is transmitted to the image processing section 310. The image processed by the image processing section 310 is transmitted to the display section 400.

The control section 320 is connected to the light source aperture driver section 103, the rotation driver section 105, the objective aperture driver section 205, the imaging element 206, the image processing section 310, and the external I/F section 500, and controls the light source aperture driver section 103, the rotation driver section 105, the objective aperture driver section 205, the imaging element 206, the image processing section 310, and the external I/F section 500.

The display section 400 displays an image or a moving image input from the image processing section 310. The display section 400 includes a display device (e.g., CRT or liquid crystal monitor) that can display a moving image.

The external I/F section 500 is an interface that allows the user to input information to the endoscope apparatus (imaging apparatus), for example. The external I/F section 500 includes a power supply switch (power supply ON/OFF switch), a shutter button (imaging (photographing) operation start button), a mode (e.g., imaging (photographing) mode) switch button, and the like. The external I/F section 500 transmits the input information to the control section 320.

3. Image Processing Section

Figure 4:
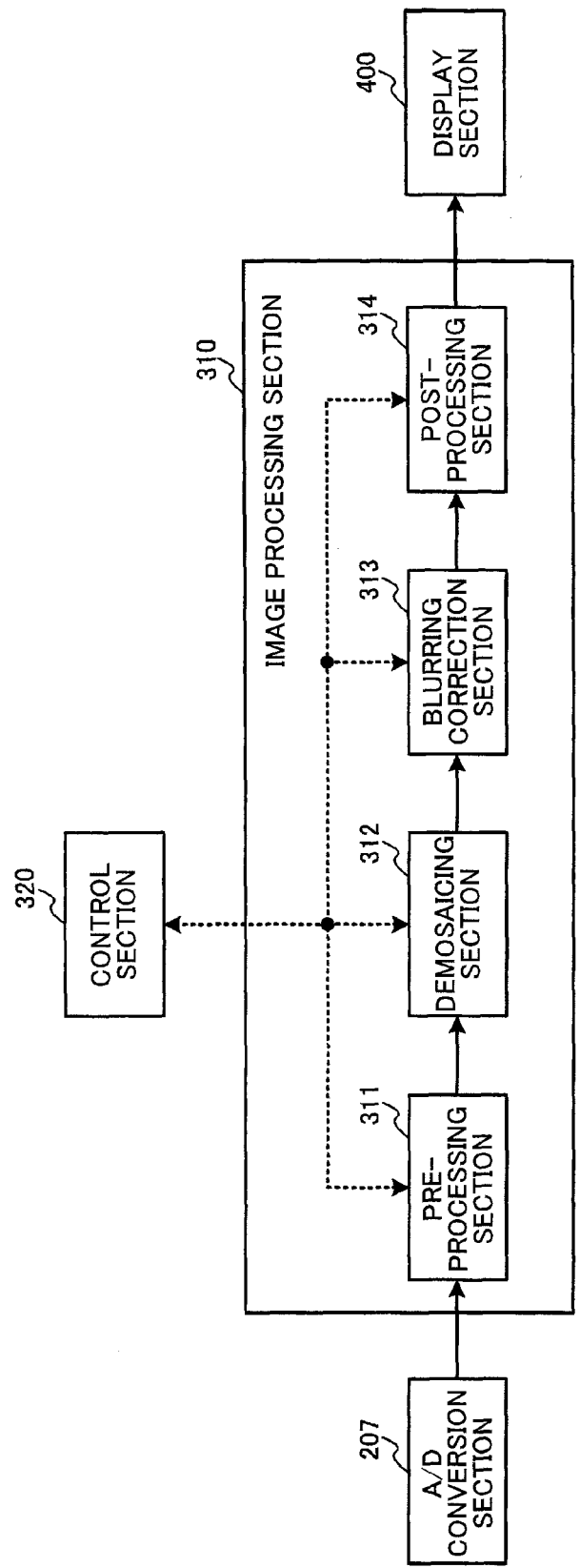
FIG. 4 shows a specific configuration example of an image processing section.

The details of the image processing section 310 are described below. FIG. 4 shows a specific configuration example of the image processing section 310. The image processing section 310 includes a preprocessing section 311, a demosaicing section 312, a blurring correction section 313, and a post-processing section 314.

The A/D conversion section 207 is connected to the preprocessing section 311. The preprocessing section 311 is connected to the demosaicing section 312. The demosaicing section 312 is connected to the blurring correction section 313. The blurring correction section 313 is connected to the post-processing section 314. The post-processing section 314 is connected to the display section 400. The control section 320 is connected to the preprocessing section 311, the demosaicing section 312, the blurring correction section 313, and the post-processing section 314, and controls the preprocessing section 311, the demosaicing section 312, the blurring correction section 313, and the post-processing section 314.

The preprocessing section 311 performs an OB clamp process, a gain control process, and a WB correction process on the digital image input from the A/D conversion section 207 using an OB clamp value, a gain correction value, and a WB coefficient stored in the control section 320. The preprocessed image is transmitted to the demosaicing section 312.

The demosaicing section 312 performs a demosaicing process on the frame-sequential R, G, and B images processed by the preprocessing section 311 based on a control signal input from the control section 320. The demosaiced images are transmitted to the blurring correction section 313.

The blurring correction section 313 performs a blurring correction process on the demosaiced time-series images. The blurring correction section 313 corrects blurring in the depth direction and blurring in the planar direction as the blurring correction process. The image subjected to the blurring correction process is transmitted to the post-processing section 314.

The post-processing section 314 performs a grayscale conversion process, a color process, a contour enhancement process, and an enlargement process using a grayscale conversion coefficient, a color conversion coefficient, a contour enhancement coefficient, and an enlargement factor stored in the control section 320. The post-processed image is transmitted to the display section 400.

4. Blurring Correction Section

Figure 5:
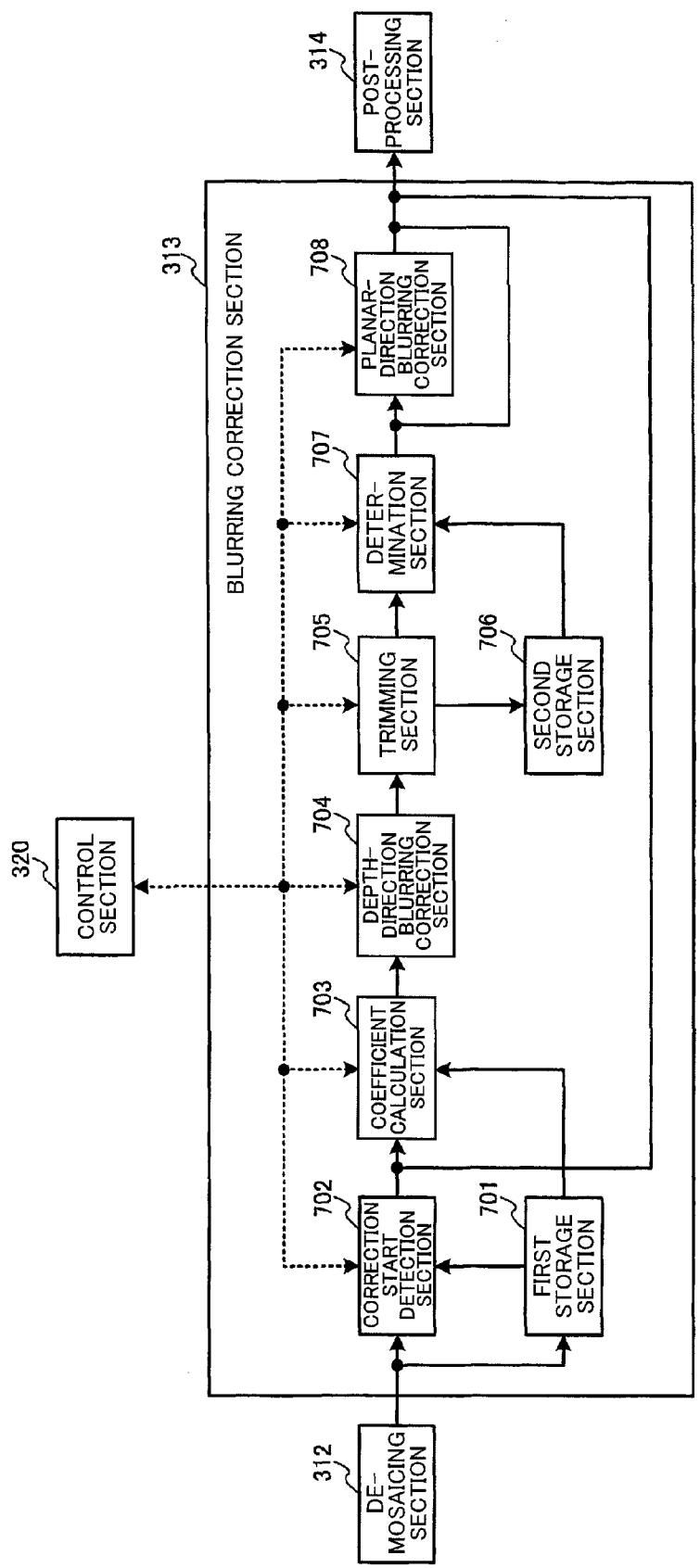
FIG. 5 shows a specific configuration example of a blurring correction section.

The details of the blurring correction section 313 are described below. FIG. 5 shows a specific configuration example of the blurring correction section 313. The blurring correction section 313 includes a first storage section 701, a correction start detection section 702, a coefficient calculation section 703, a depth-direction blurring correction section 704, a trimming section 705, a second storage section 706, a determination section 707, and a planar-direction blurring correction section 708.

The demosaicing section 312 is connected to the first storage section 701 and the correction start detection section 702. The first storage section 701 is connected to the correction start detection section 702 and the coefficient calculation section 703. The correction start detection section 702 is connected to the coefficient calculation section 703 and the post-processing section 314. The coefficient calculation section 703 is connected to the depth-direction blurring correction section 704. The depth-direction blurring correction section 704 is connected to the trimming section 705. The trimming section 705 is connected to the second storage section 706 and the determination section 707. The second storage section 706 is connected to the determination section 707. The determination section 707 is connected to the planar-direction blurring correction section 708 and the post-processing section 314. The planar-direction blurring correction section 708 is connected to the post-processing section 314. The control section 320 is connected to the correction start detection section 702, the coefficient calculation section 703, the depth-direction blurring correction section 704, the trimming section 705, the determination section 707, and the planar-direction blurring correction section 708, and controls the correction start detection section 702, the coefficient calculation section 703, the depth-direction blurring correction section 704, the trimming section 705, the determination section 707, and the planar-direction blurring correction section 708.

The first storage section 701 stores the image (image signal) input from the demosaicing section 312.

The correction start detection section 702 determines whether or not to start the blurring correction process. Specifically, the correction start detection section 702 performs a feature point matching process on the image input from the demosaicing section 312 and the image acquired in the preceding frame and stored in the first storage section 701, and calculates a motion amount Mv1 from the feature point motion vector. For example, the motion amount Mv1 is the average feature point motion vector of the entire image.

The correction start detection section 702 compares the calculated motion amount Mv1 with a given threshold value ThMv1 to determine whether or not the motion of the object within the image is large. The threshold value ThMv1 may be a value set in advance, or may be automatically set by the control section 320. The correction start detection section 702 determines that the doctor closely observes the object when the motion amount Mv1 is smaller than the threshold value ThMv1 (i.e., the motion of the object is small). In this case, the correction start detection section 702 transmits the image to the coefficient calculation section 703 in order to start the blurring correction process. The correction start detection section 702 determines that the doctor screens the object when the motion amount Mv1 is equal to or larger than the threshold value ThMv1 (i.e., the motion of the object is large). In this case, the correction start detection section 702 transmits the image to the post-processing section 314 (i.e., the blurring correction process is not performed).

Note that the doctor may input a correction start instruction using the external I/F section 500, and the blurring correction process may be performed based on the input correction start instruction. In this case, a correction start signal is input from the external I/F section 500 via the control section 320 when the correction start instruction has been input, and the image is transmitted to the coefficient calculation section 703.

The coefficient calculation section 703 calculates a correction coefficient for correcting blurring in the depth direction based on the image input from the correction start detection section 702 and the image acquired in the preceding frame and stored in the first storage section 701. Specifically, feature point information obtained by the correction start detection section 702 is input to the coefficient calculation section 703. The feature point information includes feature point information about the image in the current frame and feature point information about the image in the preceding frame. The coefficient calculation section 703 calculates a magnification Mag from the feature point shape similarity.

FIG. 6A shows a polygon formed by feature points extracted from an image acquired at a time t−1, and FIG. 6B shows a polygon formed by feature points extracted from an image acquired at a time t. The image at the time t is an image in the current frame, and the image at the time t−1 is an image in the preceding frame stored in the first storage section 701. The coefficient calculation section 703 calculates the magnification Mag so that the area of the polygon at the time t is almost equal to the area of the polygon at the time t−1. For example, the coefficient calculation section 703 calculates the ratio of the area of the polygon at the time t to the area of the polygon at the time t−1 as the magnification Mag. The calculated magnification Mag is transmitted to the depth-direction blurring correction section 704.

The depth-direction blurring correction section 704 enlarges or reduces the image based on the magnification Mag input from the coefficient calculation section 703. Specifically, the depth-direction blurring correction section 704 performs the enlargement process by electronic zoom using the reciprocal of the magnification Mag as the enlargement factor. For example, a known interpolation process is used for the enlargement process or the reduction process. FIG. 6C shows an example of an image obtained by enlarging the image acquired at the time t by the magnification Mag. Specifically, the depth-direction blurring correction section 704 causes the size of the object within the image acquired at each time (each frame) to be constant. The image subjected to the enlargement process is transmitted to the trimming section 705.

Figure 6D:
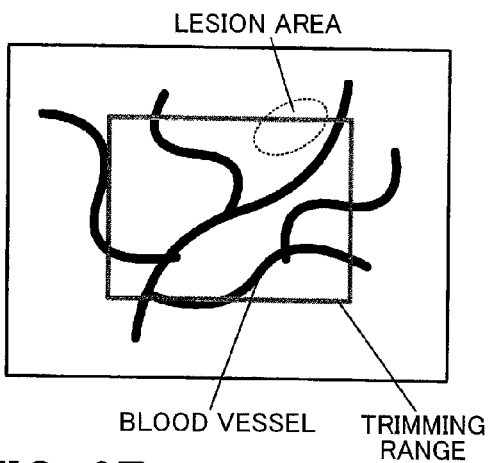
Figure 6E:
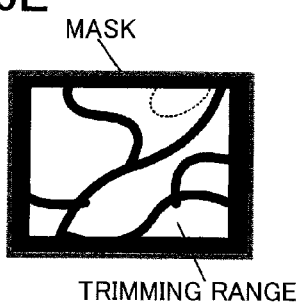

The trimming section 705 trims the image input from the depth-direction blurring correction section 704. The trimming range may be a given range designated (specified) in advance, or may be designated (specified) via the external I/F section 500 and the control section 320. FIG. 6D shows an example of the trimming range applied to the image shown in FIG. 6C. As shown in FIG. 6E, the outer area of the image is masked when the image is smaller than the trimming range. Note that the image may be enlarged to have the same size as that of the trimming range when the image is smaller than the trimming range. Specifically, the trimming section 705 extracts an image having a constant size from the image that has been enlarged or reduced by the depth-direction blurring correction process. The trimmed image is transmitted to the second storage section 706, the determination section 707, and the planar-direction blurring correction section 708.

The second storage section 706 stores the image input from the trimming section 705.

The determination section 707 determines whether or not the depth-direction correction process is stable. Specifically, the determination section 707 detects a correlation value of the image input from the trimming section 705 and the image in the preceding frame stored in the second storage section 706. The determination section 707 determines whether or not the depth-direction correction process is stable based on the correlation value.

Figure 6F:
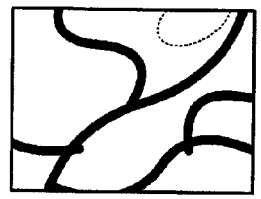
Figure 6G:

FIG. 6F shows an example of an image obtained by trimming the image shown in FIG. 6D. FIG. 6G shows an example of an image obtained by trimming the image acquired in the preceding frame of the image shown in FIG. 6F. The determination section 707 performs a feature point matching process on these images, and calculates a motion amount Mv2 from the feature point motion vector. The motion amount Mv2 is the average feature point motion vector of the entire image.

The determination section 707 compares the calculated motion amount Mv2 with a given threshold value ThMv2 to determine whether or not the motion of the object within the image is large. The threshold value ThMv2 may be a value set in advance, or may be automatically set by the control section 320. The determination section 707 determines that the depth-direction correction process is stable when the motion amount Mv2 is smaller than the threshold value ThMv2 (i.e., the motion of the object is small). In this case, the determination section 707 transmits the image to the planar-direction blurring correction section 708 in order to start a planar-direction blurring correction process (i.e., upward/downward/rightward/leftward-direction blurring correction process). The determination section 707 determines that the depth-direction correction process is not stable when the motion amount Mv2 is equal to or larger than the threshold value ThMv2 (i.e., the motion of the object is large). In this case, the determination section 707 transmits the image to the post-processing section 314 (i.e., the planar-direction blurring correction process is not performed).

The planar-direction blurring correction section 708 performs the planar-direction blurring correction process (i.e., upward/downward/rightward/leftward-direction blurring correction process) on the image input from the determination section 707. For example, the planar-direction blurring correction process is performed by a known electronic blurring correction process. The electronic blurring correction process calculates the inter-frame motion vector of the object by a matching process, and sets a trimming range corresponding to the motion vector, for example. Since the image is trimmed corresponding to the motion vector of the object, a trimmed image in which blurring of the object in the planar direction is suppressed is acquired. The image subjected to the planar-direction blurring correction process is transmitted to the post-processing section 314.

Although an example in which the determination section 707 calculates the feature point motion vector by the matching process has been described above, another method may also be employed. For example, the determination section 707 may calculate the feature point motion vector within the image subjected to the depth-direction blurring correction process based on the feature point information obtained by the correction start detection section 702 and the correction coefficient calculated by the coefficient calculation section 703.

FIG. 7 shows an example of feature point data in the blurring correction process. As shown in FIG. 7, the coordinates of feature points P1 to P3 within an image f(t) in the current frame and the coordinates of feature points P1' to P3' within an image f(t−1) in the preceding frame are calculated. The feature point is an area (e.g., a lesion area or a blood vessel intersection area) suitable for the matching process (see FIG. 6A). The feature points P1' to P3' are linked to the feature points P1 to P3 by the matching process.

The correction start detection section 702 calculates motion vectors P1-P1' to P3-P3' using the coordinates of the feature points, and determines whether or not to start the blurring correction process based on the calculated motion vectors. When the correction start condition has been satisfied, the coefficient calculation section 703 calculates the area of a polygon formed by the feature points P1 to P3 and the area of a polygon formed by the feature points P1' to P3', and calculates the magnification Mag from the calculated areas. The depth-direction blurring correction section 704 performs the electronic zoom process on the image f(t) using the calculated magnification Mag.

The determination section 707 calculates coordinates Mag·P1 to Mag·P3 of the feature points after the depth-direction blurring correction process based on the coordinates of the feature points P1 to P3 and the magnification Mag. The determination section 707 calculates motion vectors Mag·P1-P1' to Mag·P3-P3' after the depth-direction blurring correction process based on the coordinates Mag·P1 to Mag·P3 and the coordinates of the feature points P1' to P3'. The determination section 707 determines whether or not to start the planar-direction blurring correction process based on the motion vectors Mag·P1-P1' to Mag·P3-P3'.

5. Program

In one embodiment of the invention, some or all of the processes performed by each section of the image processing section 310 may be implemented by software. In this case, a CPU of a computer system (described later with reference to FIG. 17, for example) executes an image processing program.

Figure 8:
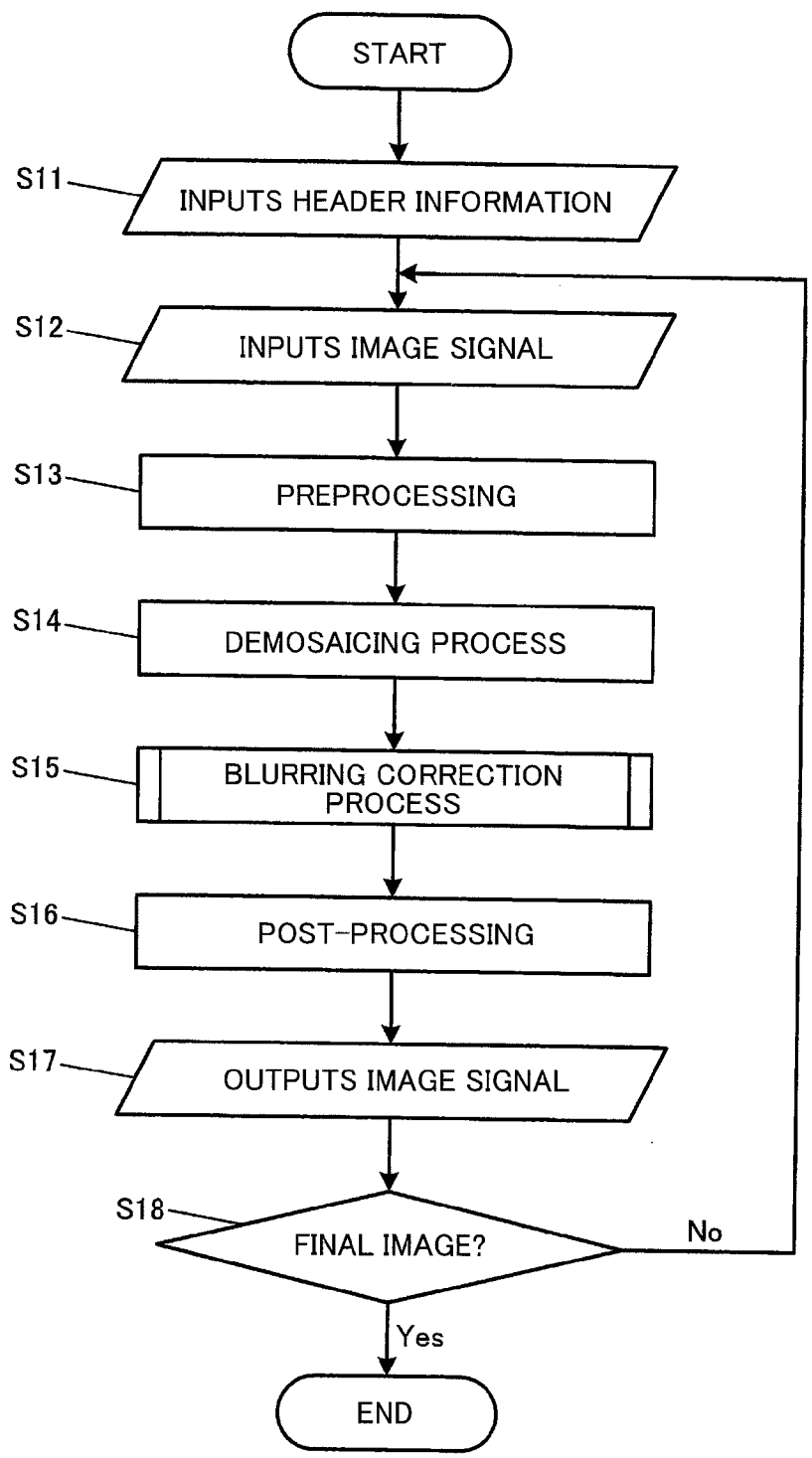
FIG. 8 shows an example of a flowchart of an image processing program.

FIG. 8 shows an example of a flowchart of the image processing program. As shown in FIG. 8, header information (e.g., light source synchronization signal and imaging (photographing) mode) is input to the time-series images (S11).

The images are input to an image buffer allocated in advance (S12). The OB clamp process, the gain control process, the WB correction process, and the like are performed on the input images (S13). The demosaicing process is performed on the input time-series images according to the light source synchronization signal (S14). Next, the blurring correction process is performed on each image (S15). The blurring correction process is described in detail later with reference to FIG. 9. The grayscale, conversion process, the color process, the contour enhancement process, and the like are performed on the image subjected to the blurring correction process (S16). The post-processed image is then output (S17).

Whether or not the final image among the time-series images has been processed is determined (S18). When it has been determined that the final image has not been processed (S18, No), the processes in the steps S12 to S17 are performed on the subsequent image. When it has been determined that the final image has been processed (S18, Yes), the process is terminated.

Figure 9:
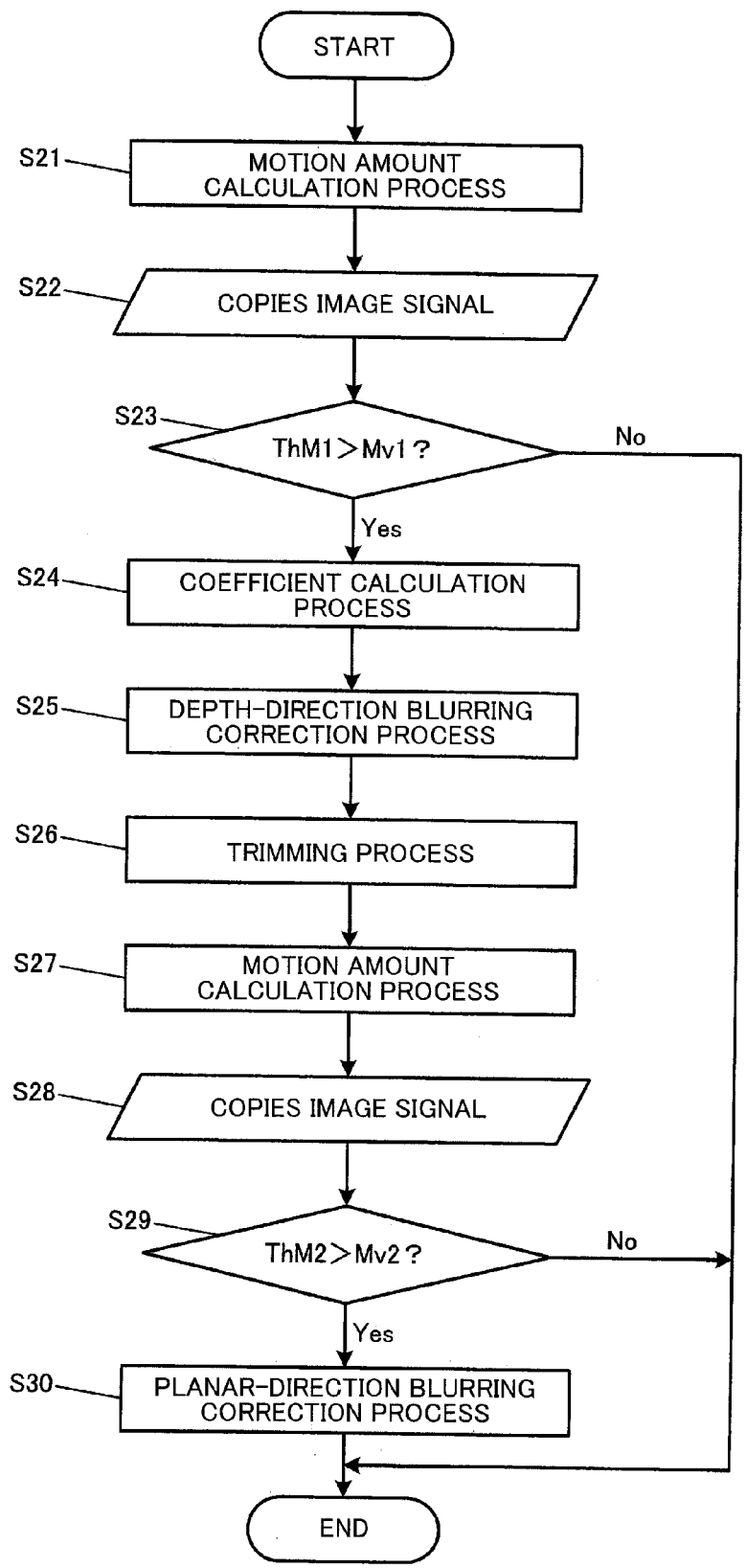
FIG. 9 shows a specific example of a flowchart of a blurring correction process.

FIG. 9 shows an example of a flowchart of the blurring correction process (step S15 in FIG. 8). As shown in FIG. 9, the feature point matching process is performed on the input image and the previous (preceding) image, and the motion amount Mv1 is calculated from the feature point motion vector (S21). An image stored in a first work image buffer used in a step S22 is used as the previous image. The input image is copied into the first work image buffer allocated in advance (S22).

Next, whether or not the motion amount Mv1 is smaller than the threshold value ThMv1 set in advance is determined (S23). When the motion amount Mv1 is equal to or larger than the threshold value ThMv1 (S23, No), the process is terminated. When the motion amount Mv1 is smaller than the threshold value ThMv1 (S23, Yes), the magnification Mag is calculated so that the area of a polygon formed by the feature points included in the image stored in the first work buffer is almost equal to the area of a polygon formed by the feature points included in the input image (S24). The depth-direction blurring correction process is performed by performing the enlargement process using the magnification Mag (S25). The image subjected to the depth-direction blurring correction process is trimmed using a given range (S26). The feature point matching process is performed on the trimmed image and the previous trimmed image, and the motion amount Mv2 is calculated from the feature point motion vector (S27). An image stored in a second work image buffer used in a step S28 is used as the previous trimmed image. The trimmed image is copied into the second work image buffer allocated in advance (S28).

Next, whether or not the motion amount Mv2 is smaller than the threshold value ThMv2 set in advance is determined (S29). When the motion amount Mv2 is equal to or larger than the threshold value ThMv2 (S29, No), the process is terminated. When the motion amount Mv2 is smaller than the threshold value ThMv2, the planar-direction blurring correction process (upward/downward/rightward/leftward-direction blurring correction process) is performed (S30).

This makes it possible to display the object to have a constant size even when the object moves due to the motion of the internal organs caused by the heartbeat. Therefore, it is possible to provide an endoscope apparatus that improves the lesion area observation capability while reducing the burden on the doctor.

The object may be blurred in the depth direction of the imaging section due to the motion of the internal organs caused by the heartbeat, so that the visibility of the observed area may deteriorate. For example, the amount of blurring in the depth direction increases during magnifying observation since the object is observed at a high magnification in a state in which the imaging section is positioned right in front of the object.

The endoscope apparatus according to the first configuration example includes an image acquisition section, the coefficient calculation section 703, and the depth-direction blurring correction section 704 (see FIG. 5). The image acquisition section acquires images in time series. The coefficient calculation section 703 calculates a correction coefficient Mag for correcting blurring in the depth direction that is a direction along the optical axis of the imaging section 200. The depth-direction blurring correction section 704 performs a process that corrects blurring in the depth direction on the images acquired in time series based on the correction coefficient Mag.

This makes it possible to suppress blurring of a moving image in the depth direction. Specifically, blurring of the moving image can be reduced even when the object moves in the depth direction due to the motion of the internal organs by correcting blurring of the image in the depth direction based on the correction coefficient Mag. This makes it possible to improve the observation capability (e.g., visibility), and reduce the burden on the doctor.

In the first configuration example, the demosaicing section 312 corresponds to the image acquisition section (see FIG. 4). Specifically, the imaging element 206 captures images in time series as a moving image, the A/D conversion section 207 converts the images into digital data, and the preprocessing section 311 performs the preprocess on the digital data. The demosaicing section 312 performs the demosaicing process to acquire images in time series as a moving image.

The image acquisition section acquires a first image and a second image subsequent to the first image in time series. The coefficient calculation section 703 calculates the correction coefficient Mag that corresponds to the magnification of the second image with respect to the first image. The depth-direction blurring correction section 704 performs the depth-direction blurring correction process by correcting a change in magnification of images due to blurring in the depth direction based on the correction coefficient Mag.

This makes it possible to correct blurring in the depth direction based on the correction coefficient Mag. Specifically, a change in magnification of images acquired in time series can be corrected based on the correction coefficient Mag by calculating the correction coefficient Mag that corresponds to the magnification of the second image with respect to the first image.

The first image refers to an image in the preceding frame of the processing target frame, and the second image refers to an image in the processing target frame, for example. The correction coefficient that corresponds to the magnification of the second image with respect to the first image may be magnification calculated from the first image and the second image by image processing, or may be magnification calculated from another information (e.g., the position of an AF lens (described later). A change in magnification is not necessarily corrected by correcting the magnification of the second image. For example, the imaging magnification of a third image subsequent to the second image may be corrected by optical zoom (described later).

The endoscope apparatus according to the first configuration example includes the correction start detection section 702 that detects a start timing of the depth-direction blurring correction process (see FIG. 5). The depth-direction blurring correction section 704 starts the depth-direction blurring correction process when the correction start detection section 702 has detected the start timing of the depth-direction blurring correction process.

This makes it possible to perform the depth-direction blurring correction process when the depth-direction blurring correction process has become necessary. For example, the depth-direction blurring correction process can be started when it has been determined that the amount of blurring of the object image in the direction along the optical axis of the imaging section has exceeded a given reference range. This makes it possible to prevent a situation in which the depth-direction blurring correction process hinders a lesion area search process that is performed while moving the imaging section along the digestive tract, for example.

The endoscope apparatus according to the first configuration example includes the determination section 707 and the planar-direction blurring correction section 708 (see FIG. 5). The determination section 707 determines whether or not the amount of blurring in the depth direction after the depth-direction blurring correction process is within a given reference range. The planar-direction blurring correction section 708 that performs a planar-direction blurring correction process that corrects planar-direction blurring that is blurring in a direction that perpendicularly intersects the optical axis of the imaging section 200 when the determination section 707 has determined that the amount of blurring in the depth direction is within the given reference range.

This makes it possible to correct planar-direction blurring when the amount of blurring in the depth direction is within the given reference range (i.e., is stable). For example, the magnification of the images changes to a large extent in a state in which blurring in the depth direction has not been sufficiently corrected. In this case, the planar-direction blurring correction accuracy deteriorates due to poor inter-frame matching accuracy. Therefore, the planar-direction blurring correction accuracy can be improved by determining blurring in the depth direction, and then correcting planar-direction blurring.

In the first configuration example, the coefficient calculation section 703 calculates the magnification of the second image with respect to the first image as the correction coefficient Mag based on the ratio of the area of a region enclosed by the feature points P1' to P3' included in the first image and the area of a region enclosed by the feature points P1 to P3 included in the second image corresponding to the feature points P1' to P3' included in the first image, as described above with reference to FIG. 6A and the like.

This makes it possible to calculate the magnification of the second image with respect to the first image as the correction coefficient. Moreover, the correction coefficient can be calculated by image processing.

In the first configuration example, the depth-direction blurring correction section 704 performs the depth-direction blurring correction process by enlarging or reducing the image based on the correction coefficient Mag. Specifically, the coefficient calculation section 703 calculates the magnification of the second image with respect to the first image as the correction coefficient Mag. The depth-direction blurring correction section 704 enlarges or reduces the second image based on the correction coefficient Mag. The endoscope apparatus includes the trimming section that trims an image having a given size from the image subjected to the depth-direction blurring correction process (see FIG. 5).

This makes it possible to perform the depth-direction blurring correction process by electronic zoom that increases or reduces the image size. Specifically, blurring in the depth direction be corrected by calculating the magnification as the correction coefficient, and enlarging the second image by electronic zoom using the calculated magnification. Since the depth-direction blurring correction process can be performed without using a mechanical mechanism by utilizing electronic zoom, it is unnecessary to increase the thickness of the end of the imaging section. Moreover, the image can be displayed to have a given size by trimming the image even if the image size has changed due to electronic zoom.

In the first configuration example, the correction start detection section 702 determines whether or not to start the depth-direction blurring correction process based on the motion information about the object included in the image. The depth-direction blurring correction section 704 starts the depth-direction blurring correction process when the correction start detection section 702 has determined to start the depth-direction blurring correction process. Specifically, the correction start detection section 702 calculates the motion amount Mv1 that indicates the amount of blurring in the depth direction based on the motion information about the object included in the first image and the second image, and determines to start the depth-direction blurring correction process when the motion amount Mv1 is equal to or larger than the threshold value ThMv1.

For example, the correction start detection section 702 calculates the coordinates of the feature points P1 to P3 by the matching process, calculates the motion vectors of the feature points P1 to P3 as the motion information, and calculates the average value of the motion vectors as the motion amount Mv1.

This makes it possible to detect the start timing of the depth-direction blurring correction process based on the motion information calculated by image processing. It is possible to determine whether or not the amount of blurring in the depth direction is within a given reference range by determining whether or not the motion amount Mv1 is smaller than the threshold value ThMv1.

The determination section 707 determines whether or not the amount of blurring in the depth direction after the depth-direction blurring correction process is within a given reference range based on the motion information about the image after the depth-direction blurring correction process. Specifically, the determination section 707 calculates the motion amount Mv2 that indicates the amount of blurring in the depth direction based on the motion information about the feature points P1' to P3' included in the first image and the feature points P1 to P3 included in the second image corresponding to the feature points P1' to P3' included in the first image after the depth-direction blurring correction process. The determination section 707 determines to start the planar-direction blurring correction process when the motion amount Mv2 is smaller than the threshold value ThMv2.

This makes it possible to detect the start timing of the planar-direction blurring correction process based on the motion information about the image after the depth-direction blurring correction process. It is possible to determine whether or not the amount of blurring in the depth direction after the depth-direction blurring correction process is within a given reference range by determining whether or not the motion amount Mv2 is smaller than the threshold value ThMv2.

In the first configuration example, the planar-direction blurring correction section 708 performs the planar-direction blurring correction process by an electronic blurring correction process. The electronic blurring correction process may be performed using the feature point motion vector calculated by the determination section 707, or may be performed using a motion vector calculated by another matching process.

Although an example in which the motion information about the object is calculated based on the captured image has been described above, another configuration may also be employed. For example, a sensor may be provided on the end of the imaging section 200, and motion information about the end of the imaging section 200 may be acquired using the sensor. The depth-direction blurring correction process or the planar-direction blurring correction process may be performed based on the acquired motion information.

6. Second Configuration Example of Endoscope Apparatus

Figure 10:
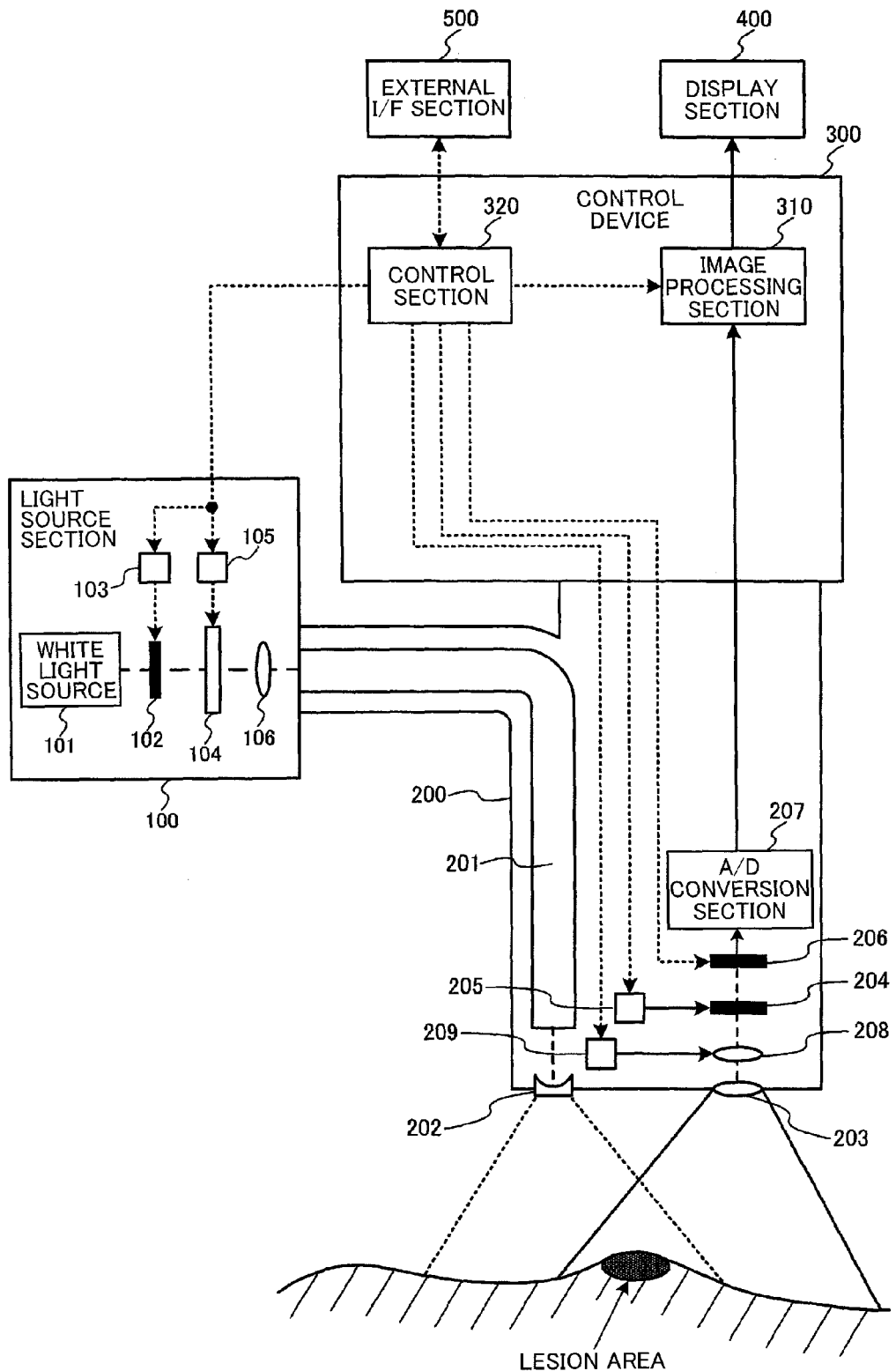
FIG. 10 shows a second configuration example of an endoscope apparatus.

In one embodiment of the invention, the imaging section may perform an autofocus process, and the magnification Mag may be calculated based on the in-focus object plane set by the autofocus process. FIG. 10 shows a second configuration example of the endoscope apparatus employed when implementing such a feature. The endoscope apparatus shown in FIG. 10 includes a light source section 100, an imaging section 200, a control device 300, a display section 400, and an external I/F section 500. Note that the same elements as those described above in connection with the first configuration example (see FIG. 1 and the like) are indicated by the same reference symbols. Description of these elements is appropriately omitted.

The imaging section 200 includes an AF lens 208 and an AF lens driver section 209. The AF lens driver section 209 moves the AF lens 208 in the optical axis direction. The AF lens driver section 209 moves the AF lens 208 to a given position based on a control signal output from the control section 320.

The control device 300 according to the second configuration example differs from the control device 300 according to the first configuration example as to the specific configuration of the image processing section 310, and the control process of the control section 320 is changed to implement an AF control process.

Figure 11:
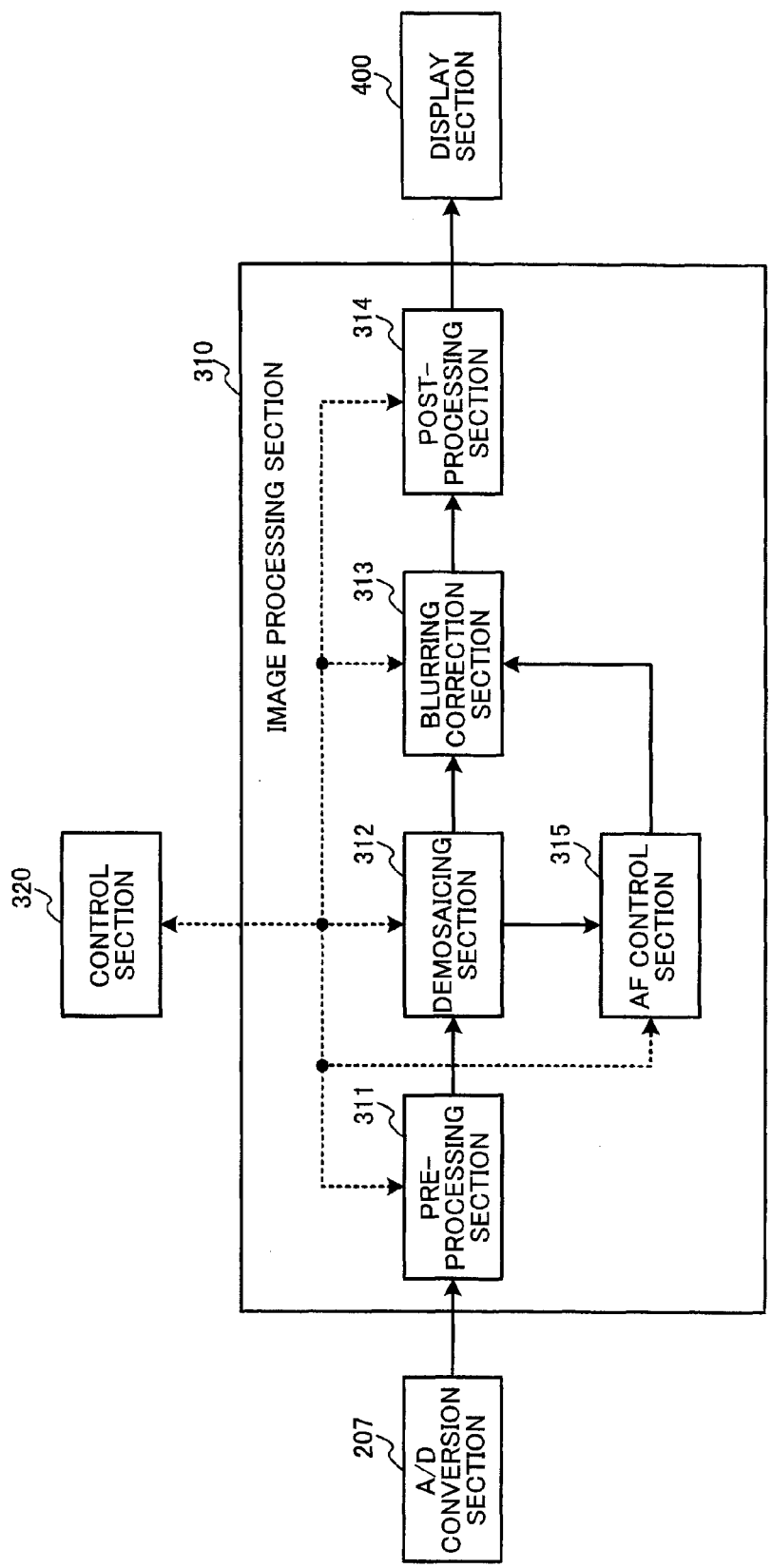
FIG. 11 shows a second specific configuration example of an image processing section.

FIG. 11 shows a second specific configuration example of the image processing section 310. The image processing section 310 additionally includes an AF control section 315. The details of the blurring correction section 313 also differ from those of the blurring correction section 313 according to the first configuration example (see FIG. 4 and the like). The demosaicing section 312 is connected to the blurring correction section 313 and the AF control section 315. The AF control section 315 is connected to the blurring correction section 313. The AF control section 315 is bidirectionally connected to the control section 320.

The AF control section 315 performs the AF control process under control of the control section 320. For example, the AF control section 315 performs the AF control process when the variable aperture 204 is opened under control of the control section 320. Specifically, the AF control section 315 performs a contrast AF process based on the image input from the demosaicing section 312, and transmits an AF control process signal to the AF lens driver section 209 via the control section 320. The contrast AF process is implemented by a known process, for example. An outline of the contrast AF process is described below.

Specifically, an AF evaluation value A1 is calculated at an initial position p1 of the lens. The sum of the signal values of images passed through a high-pass filter is used as the AF evaluation value, for example. The AF lens 208 is moved to a position p2 at a given distance from the position p1 in the infinite direction or the direction opposite to the infinite direction, and an AF evaluation value A2 is calculated at the position p2. The AF evaluation values A1 and A2 are compared to determine the direction of the focus target position (the object position). The AF lens 208 is moved by a given distance toward the focus target position, and AF evaluation values A3 and A4 are calculated at positions p3 and p4, respectively. When the AF evaluation value has passed through the peak (i.e., the focus target position), the focus target position is calculated by interpolation calculations using three points around the focus target position and the AF evaluation values. Linear interpolation or the like is used for the interpolation calculations. Note that Lagrange interpolation, spline interpolation, or the like may also be used. The AF lens is moved to the position corresponding to the calculated focus target position so that the in-focus object plane position is moved to the focus target position, and the AF process is repeated.

Figure 12:
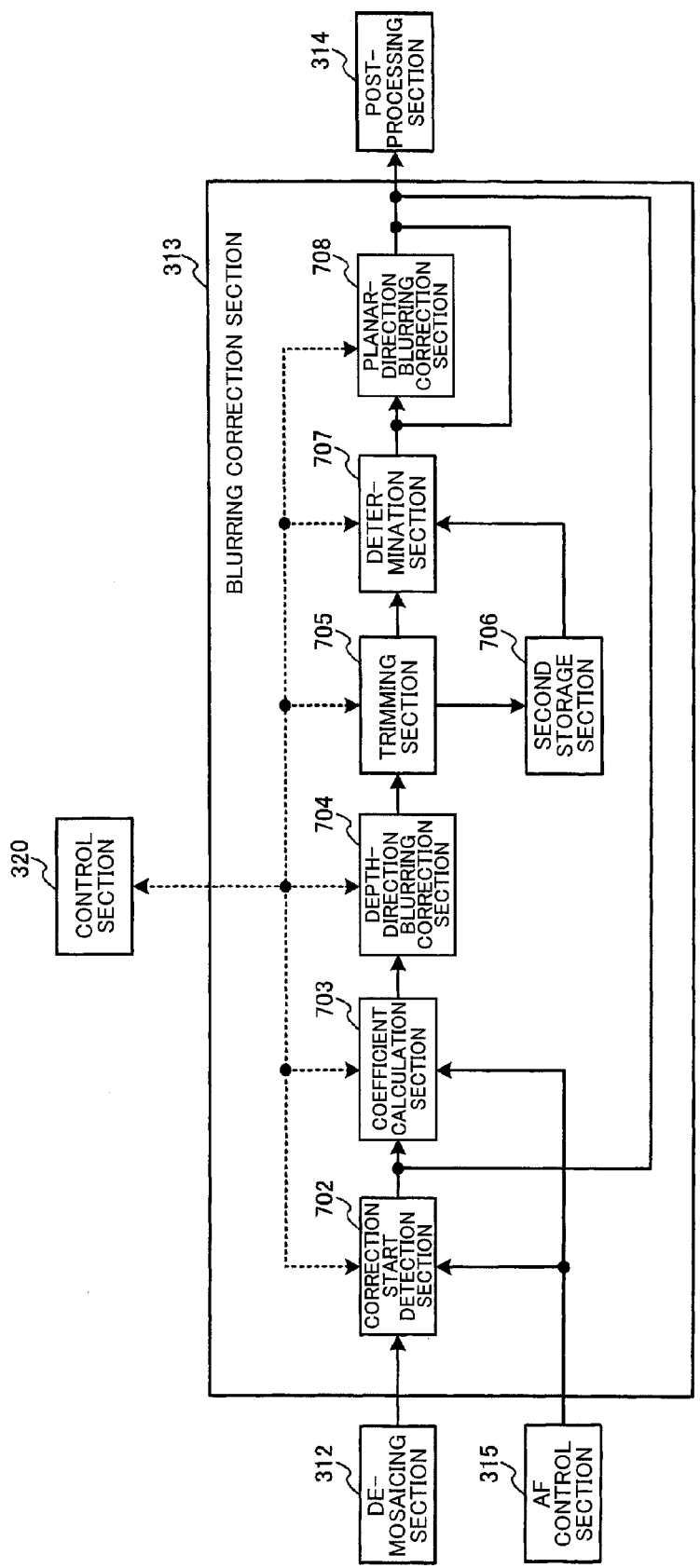
FIG. 12 shows a second specific configuration example of a blurring correction section.

The details of the blurring correction section 313 are described below. FIG. 12 shows a specific configuration example of the blurring correction section 313. The blurring correction section 313 according to the second configuration example differs from the blurring correction section 313 according to the first configuration example (see FIG. 5 and the like) in that the first storage section 701 is omitted. The details of the correction start detection section 702 and the coefficient calculation section 703 also differ from those according to the first configuration example. The AF control section 315 is connected to the correction start detection section 702 and the coefficient calculation section 703.

The correction start detection section 702 starts the blurring correction process at a timing at which the AF control section 315 has started the AF control process. The correction start detection section 702 transmits the image to the coefficient calculation section 703 when the AF control section 315 performs the AF control process. The correction start detection section 702 transmits the image to the post-processing section 314 when the AF control section 315 does not perform the AF control process.

The coefficient calculation section 703 calculates a depth-direction blurring correction coefficient based on an AF control signal input from the AF control section 315. Specifically, the coefficient calculation section 703 calculates the magnification Mag based on the position of the AF lens 208 and the position of the AF lens 208 when the in-focus object plane has been moved at the next timing. More specifically, the coefficient calculation section 703 calculates a in-focus object plane distance fa at the position of the AF lens 208 and a in-focus object plane distance fb at the position of the AF lens 208 when the in-focus object plane position has been moved at the next timing using a look-up table (LUT) that indicates the relationship between the position of the AF lens 208 and the in-focus object plane distance. The coefficient calculation section 703 calculates the magnification Mag from the ratio of the in-focus object plane distance fa and the in-focus object plane distance fb.

For example, the LUT is configured so that the position of the AF lens 208 is linked to the in-focus object plane distance as shown below. Note that n is a natural number.

Lens position: in-focus object plane distance f
x1: fx1
x2: fx2
x3: fx3
xn: fxn

The in-focus object plane distance f is determined from the position of the AF lens by acquiring AF lens position information from the AF control section 315, and referring to the LUT. When the in-focus object plane distance when the processing target image is captured is referred to as ft, and the in-focus object plane distance when the image in the preceding frame of the processing target image is captured is referred to as ft−1, the magnification Mag is calculated by the following expression (1).

$$Mag = ft-1/ft \qquad (1)$$

7. Second Example of Program

In one embodiment of the invention, some or all of the processes performed by each section of the image processing section 310 shown in FIG. 11 may be implemented by software. In this case, a CPU of a computer system (described later with reference to FIG. 17, for example) executes an image processing program.

Figure 13:
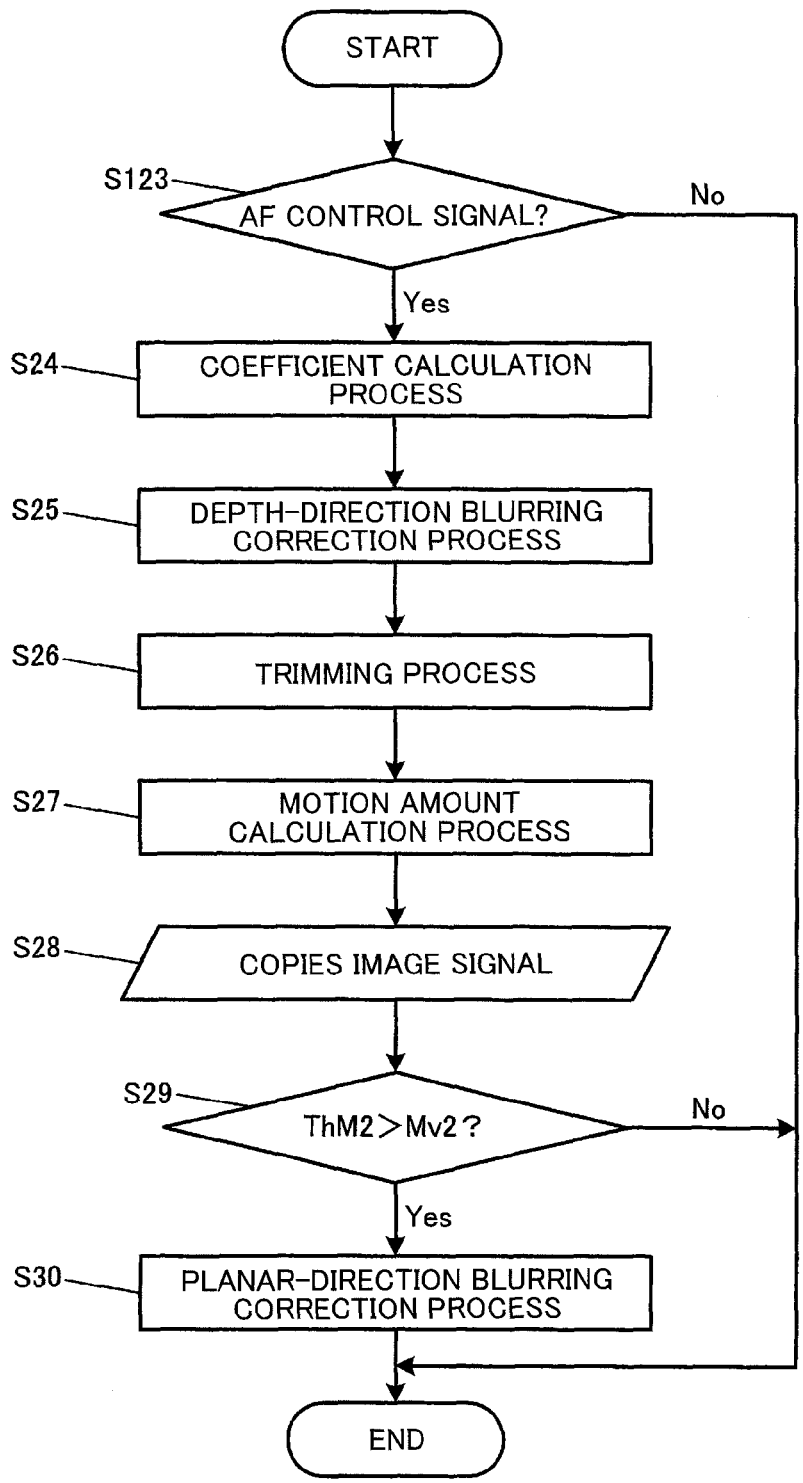
FIG. 13 shows a second specific example of a flowchart of a blurring correction process.

FIG. 13 shows a second example of a flowchart of the blurring correction process. Note that the flowchart shown in FIG. 13 differs from the flowchart shown in FIG. 8 as to the details of the steps S11 and S15. The remaining steps are the same as those shown in FIG. 8. Specifically, the AF control signal is added to the header information in the step S11. The details of the step S15 are described below with reference to FIG. 13.

The flowchart shown in FIG. 13 differs from the flowchart shown in FIG. 9 in that the steps S21 to S23 are omitted, and a step S123 is additionally provided. In the step S123, whether or not the image is an image acquired when the AF control process is performed is determined from the header information about the image. When the image is an image acquired when the AF control process is performed, the process transitions to the step S24. When the image is an image acquired when the AF control process is not performed, the process ends.

According to the second configuration example, the imaging section 200 includes an optical system that performs the autofocus process. The coefficient calculation section 703 calculates the correction coefficient Mag based on the in-focus object plane position (the in-focus object plane distance) of the optical system adjusted by the autofocus process. Specifically, the coefficient calculation section 703 calculates the magnification ft−1/ft of the second image with respect to the first image as the correction coefficient Mag based on the in-focus object plane ft−1 when the first image is captured and the in-focus object plane ft when the second image is captured.

According to this configuration, an in-focus state can always be achieved even during magnifying observation (i.e., the depth of field of the imaging system is shallow) by utilizing the autofocus process. This makes it possible to necessarily perform the depth-direction blurring correction process in an in-focus state, so that the burden on the doctor can be reduced while improving the observation capability. Moreover, since the distance from the imaging section to the object can be determined by the in-focus object plane, the magnification can be calculated based on the in-focus object plane ratio.

The autofocus process is implemented by causing the control section 320 to control the AF lens driver section 209 so that the AF lens driver section 209 drives the AF lens 208 (see FIG. 10). The in-focus object plane of the optical system refers to the distance from the imaging section to the object when the object is in focus, and is determined by the position of the AF lens 208. The position of the AF lens refers to the distance from the AF lens 208 to the objective lens 203, for example. The in-focus object plane position (in-focus object plane distance f) is calculated from the position of the AF lens.

In the second configuration example, the correction start detection section 702 determines whether or not to start the depth-direction blurring correction process based on the state of the autofocus process. For example, the optical system of the imaging section 200 may perform an optical zoom process. In this case, the autofocus process is enabled in a magnifying observation mode in which the magnification is higher than the optical zoom magnification employed in a normal observation mode. The correction start detection section 702 determines to start the depth-direction blurring correction process when the autofocus process has been enabled.

This makes it possible to detect the start timing of the depth-direction blurring correction process based on the state of the autofocus process. For example, the start timing can be detected corresponding to the enabled/disabled state of the autofocus process, the focus adjustment frequency, the moving amount of the position of the AF lens, or the like. Moreover, the depth-direction blurring correction process can be performed in the magnifying observation mode in which the amount of blurring is large, by enabling the autofocus process in the magnifying observation mode to detect the start timing.

8. Third Configuration Example of Endoscope Apparatus

Figure 14:
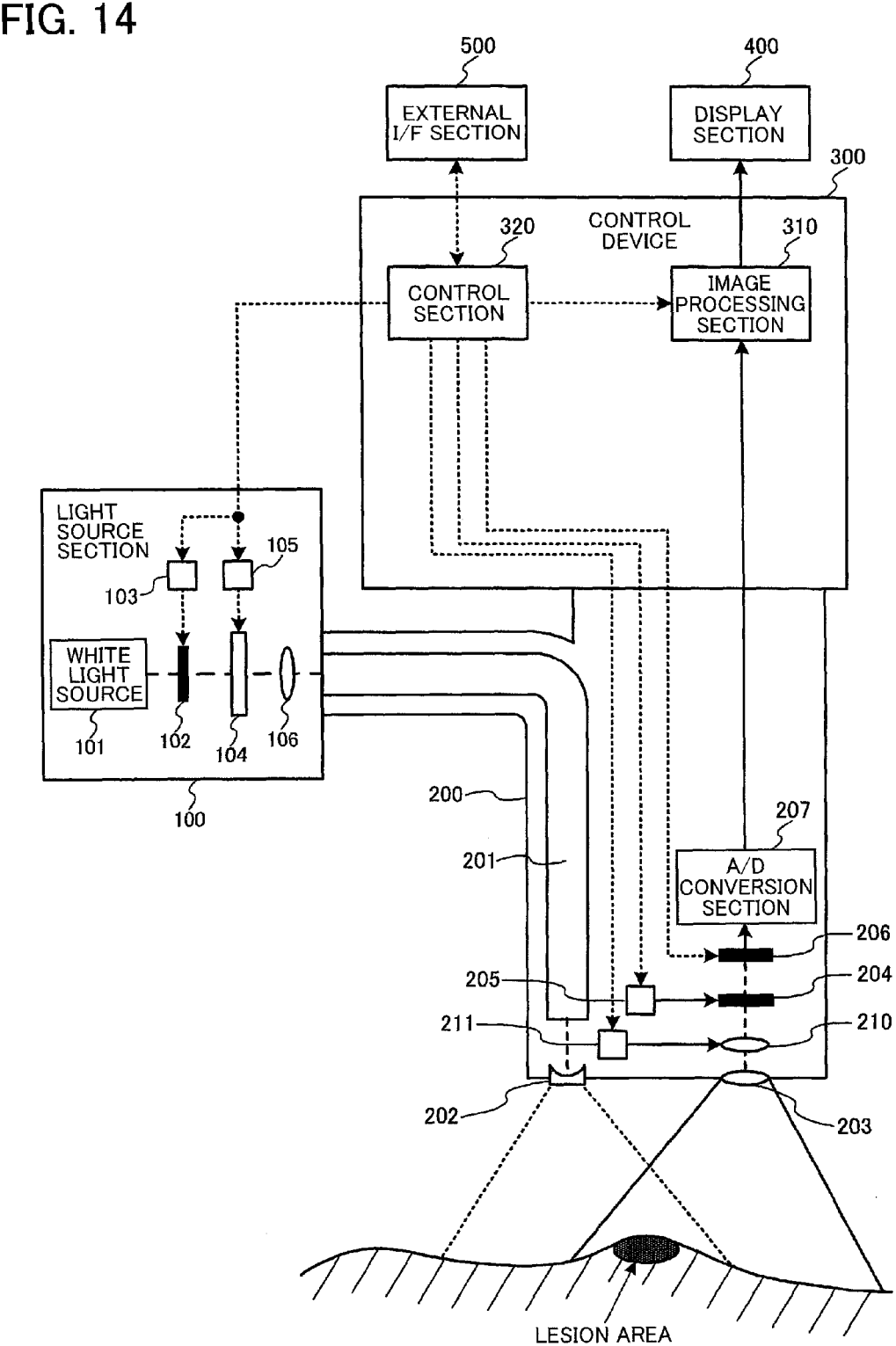
FIG. 14 shows a third configuration example of an endoscope apparatus.

In one embodiment of the invention, the imaging section may have an optical zoom function, and blurring in the depth direction may be corrected by optical zoom. FIG. 14 shows a third configuration example of the endoscope apparatus employed when implementing such a feature. The endoscope system includes a light source section 100, an imaging section 200, a control device 300, a display section 400, and an external I/F section 500. Note that the same elements as those described above in connection with the first configuration example (see FIG. 1 and the like) are indicated by the same reference symbols. Description of these elements is appropriately omitted.

The imaging section 200 includes a zoom lens 210 and a zoom lens driver section 211. The zoom lens driver section 211 moves the zoom lens 210 in the optical axis direction. The zoom lens driver section 211 moves the zoom lens 210 to a given position based on a control signal output from the control section 320.

The control device 300 according to the third configuration example differs from the control device 300 according to the first configuration example (see FIG. 1) as to the details of the image processing section 310, and the control process of the control section 320 is changed to implement a zoom control process.

Figure 15:
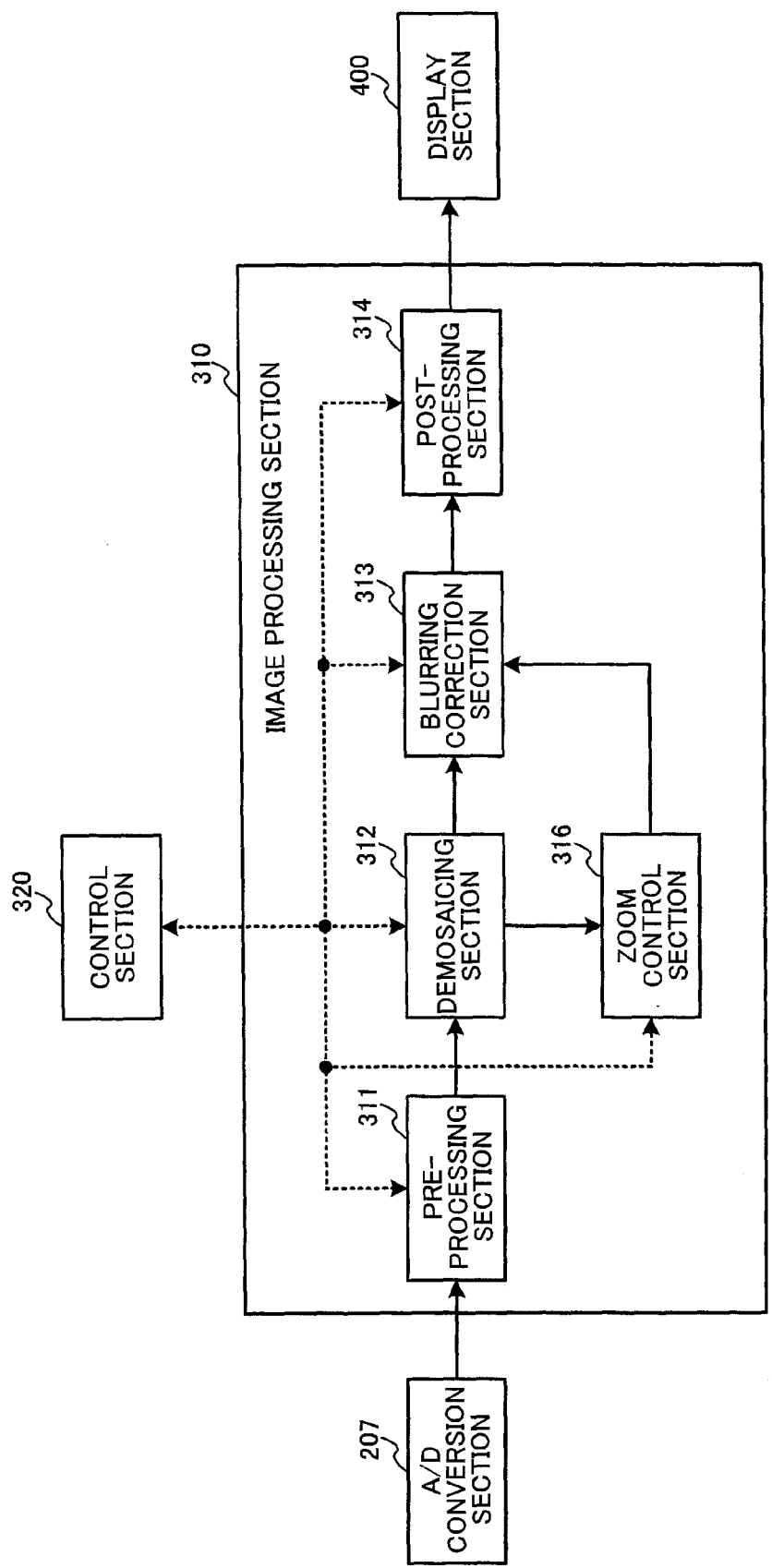
FIG. 15 shows a third specific configuration example of an image processing section.

FIG. 15 shows a third specific configuration example of the image processing section 310. The image processing section 310 according to the third configuration example differs from the image processing section 310 according to the first configuration example (see FIG. 4) in that a zoom control section 316 is additionally provided. The details of the blurring correction section 313 also differ from those of the blurring correction section 313 according to the first configuration example. The blurring correction section 313 is connected to the zoom control section 316. The zoom control section 316 is bidirectionally connected to the control section 320.

The zoom control section 316 performs an optical zoom control process based on the correction coefficient used when performing the depth-direction blurring correction process. Specifically, the zoom control section 316 transmits a zoom control signal to the zoom lens driver section 211 via the control section 320 based on the magnification Mag input from the blurring correction section 313. The zoom control section 316 calculates a focal length fb after the zoom process from the magnification Mag and the current focal length fa. The zoom control section 316 calculates the lens position from the focal length fb after the zoom process. For example, the zoom control section 316 calculates the lens position referring to a LUT in which the focal length is linked to the lens position, and controls the zoom lens driver section 211 based on the lens position.

Figure 16:
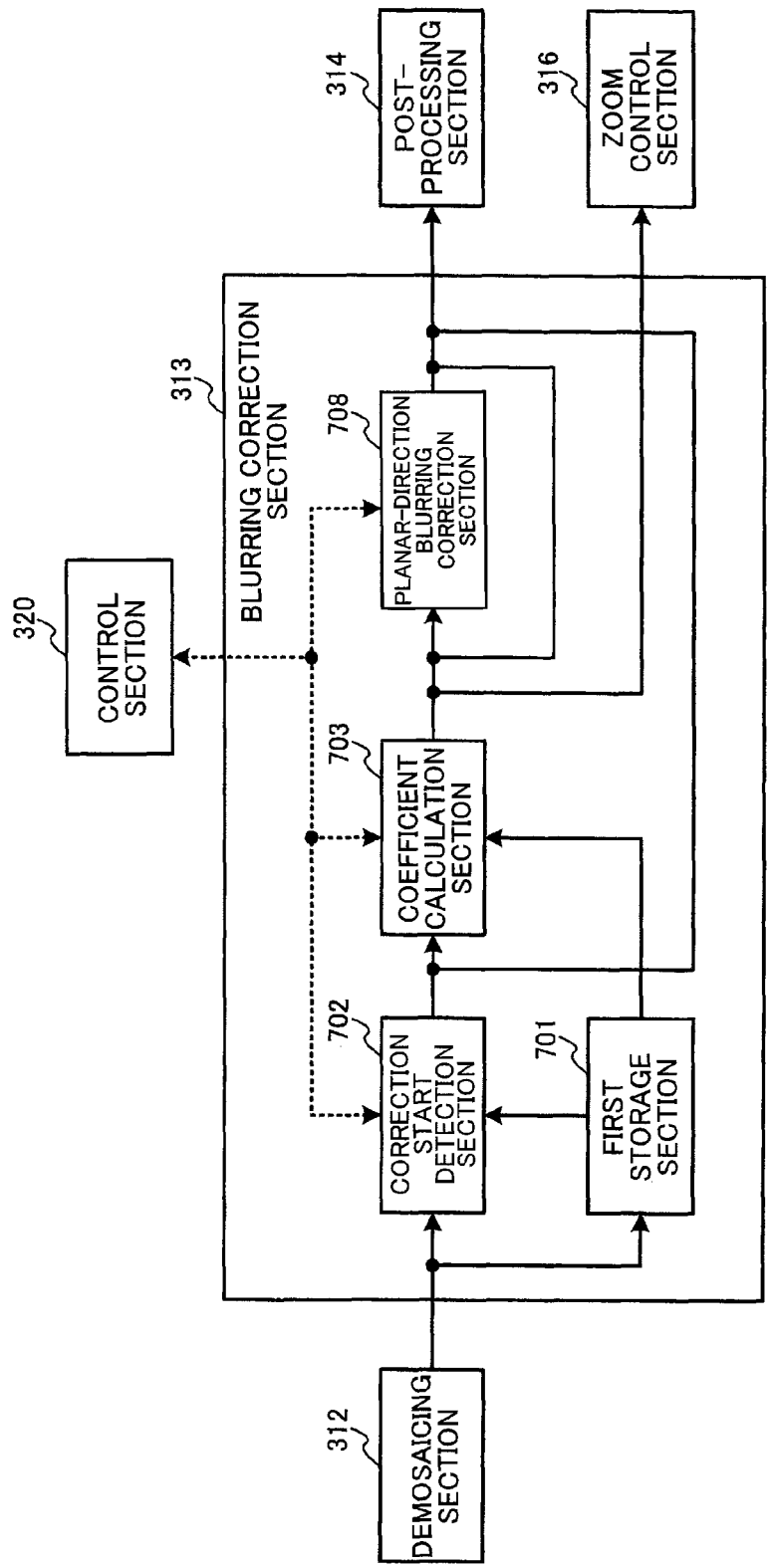
FIG. 16 shows a third specific configuration example of a blurring correction section.

The details of the blurring correction section 313 are described below. FIG. 16 shows a third specific configuration example of the blurring correction section 313. The blurring correction section 313 shown in FIG. 16 differs from the blurring correction section 313 according to the first configuration example (see FIG. 5) in that the depth-direction blurring correction section 704, the trimming section 705, the second storage section 706, and the determination section 707 are omitted. The details of the correction start detection section 702 and the coefficient calculation section 703 also differ from those according to the first configuration example. The coefficient calculation section 703 is connected to the planar-direction blurring correction section 708, the post-processing section 314, and the zoom control section 316.

The correction start detection section 702 determines whether or not to start the depth-direction blurring correction process (optical zoom control process) or the planar-direction blurring correction process. The correction start detection section 702 calculates the motion amount Mv by the matching process in the same manner as described above (see FIG. 6A and the like). The correction start detection section 702 compares the motion amount Mv with threshold values ThMv1 and ThMv2 (ThMv1>ThMv2).

When the motion amount Mv is smaller than the threshold value ThMv2, the correction start detection section 702 transmits a control signal that instructs start of the planar-direction blurring correction process to the coefficient calculation section 703 via the control section 320, and transmits the image to the coefficient calculation section 703. When the motion amount Mv is smaller than the threshold value ThMv1, and is equal to or larger than the threshold value ThMv2, the correction start detection section 702 transmits a control signal that does not instruct start of the planar-direction blurring correction process to the coefficient calculation section 703 via the control section 320, and transmits the image to the coefficient calculation section 703. When the motion amount Mv is equal to or larger than the threshold value ThMv1, the correction start detection section 702 transmits the image to the post-processing section 314.

The coefficient calculation section 703 transmits the calculated magnification Mag to the zoom control section 316. When the control signal input from the control section 320 instructs start of the planar-direction blurring correction process, the coefficient calculation section 703 transmits the image to the planar-direction blurring correction section 708. When the control signal input from the control section 320 does not instruct start of the planar-direction blurring correction process, the coefficient calculation section 703 transmits the image to the post-processing section 314.

According to the third configuration example, the imaging section 200 includes an optical system that performs the optical zoom process. The depth-direction blurring correction section 704 performs the depth-direction blurring correction process by adjusting the optical zoom magnification of the optical system based on the correction coefficient Mag. For example, a first image, second image, and a third image are acquired in time series, and the magnification of the second image with respect to the first image is used as the correction coefficient. The optical zoom magnification is changed by the reciprocal of the correction coefficient when capturing the third image subsequent to the second image.

It is possible to necessarily perform the depth-direction blurring correction process without causing a deterioration in image by utilizing the optical zoom process, so that the burden on the doctor can be reduced while improving the observation capability. The number of heartbeats per second is about one, and is smaller than a normal imaging frame rate (e.g., 30 frames per second). Therefore, the correction process is performed with a delay of one frame when using the optical zoom process. However, blurring in the depth direction can be sufficiently suppressed.

Although an example in which the imaging element 206 is a single monochrome imaging element has been described above, another configuration may also be employed. For example, the imaging element 206 may be an imaging element using a primary color Bayer array filter, or may be an imaging element using a complementary color filter. In this case, the rotary color filter 104 and the rotation driver section 105 included in the light source section can be omitted. The demosaicing section 312 included in the image processing section 310 performs an interpolation process (demosaicing process). The interpolation process may be implemented by known linear interpolation or the like.

Although an example in which the imaging section has the AF function or the optical zoom function has been described above, the imaging section may have both the AF function and the optical zoom function.

9. Computer System

Although an example in which each section of the image processing section 310 is implemented by hardware has been described above, another configuration may also be employed. For example, a CPU may perform the process of each section on an image acquired using an imaging apparatus such as a capsule endoscope. Specifically, the process of each section may be implemented by software by causing the CPU to execute a program. Alternatively, part of the process of each section may be implemented by means of software. The image acquired in advance refers to a Bayer array output image output from the A/D conversion section 207 and recorded on a recording medium as a RAW file, for example.

When separately providing the imaging section, and implementing the process of each section of the image processing section 310 by means of software, a known computer system (e.g., work station or personal computer) may be used as an image processing device. A program (image processing program) that implements the process of each section of the image processing section 310 may be provided in advance, and executed by the CPU of the computer system.

Figure 17:
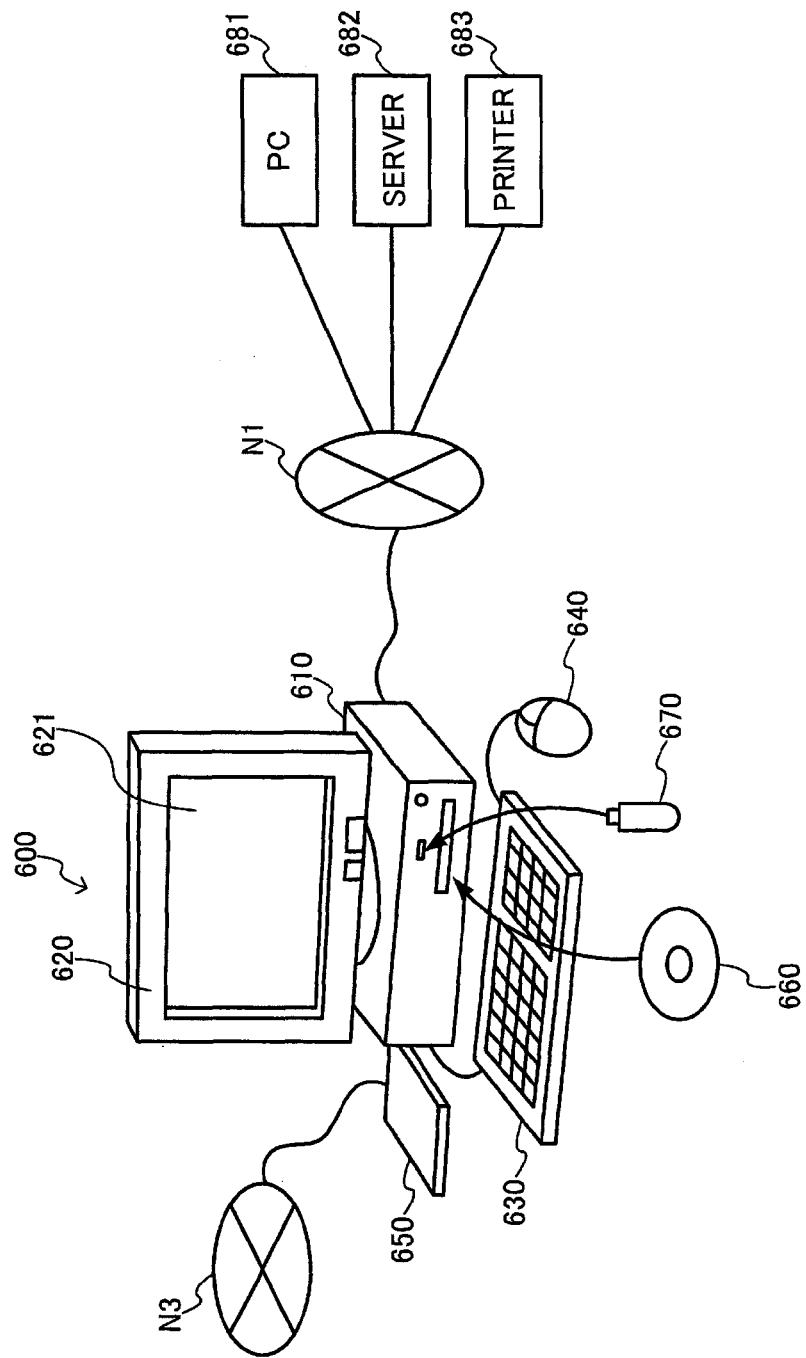
FIG. 17 is a system configuration diagram showing the configuration of a computer system.
Figure 18:
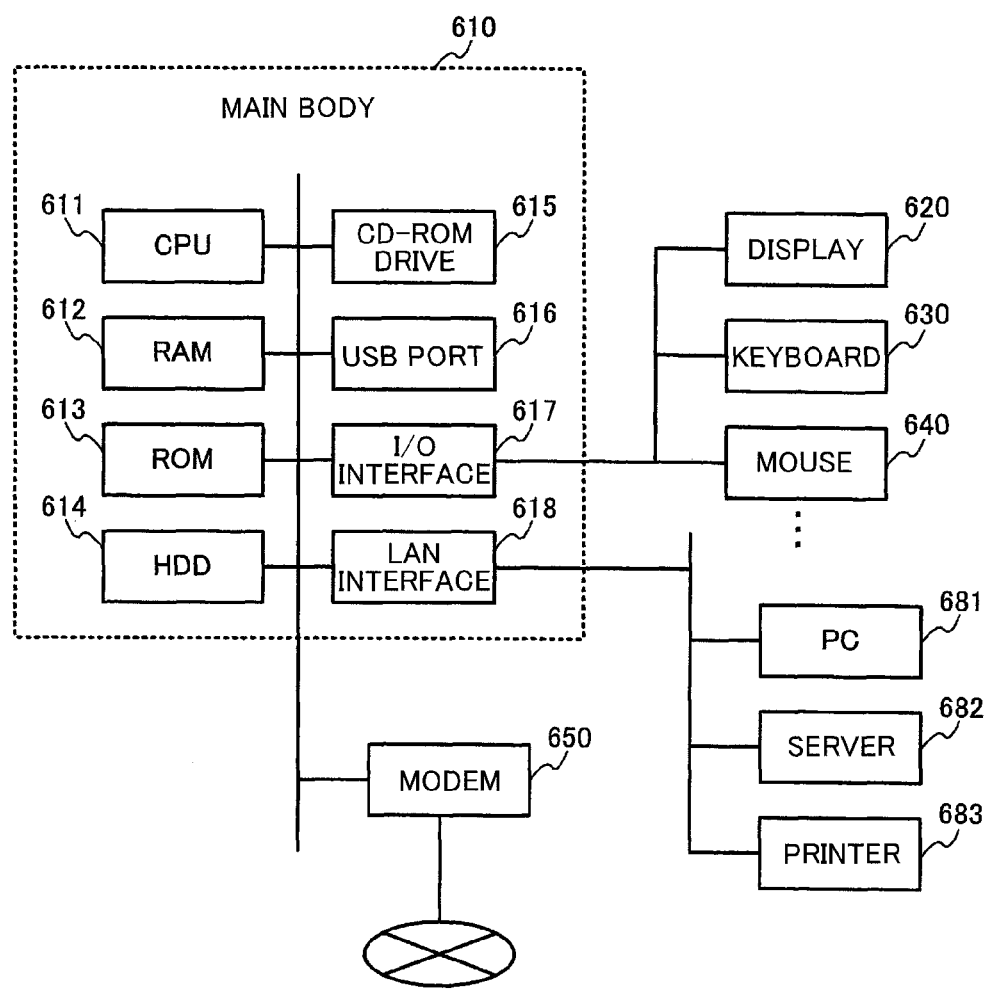
FIG. 18 is a block diagram showing the configuration of a main body included in a computer system.

FIG. 17 is a system configuration diagram showing the configuration of a computer system 600 according to a modification. FIG. 18 is a block diagram showing the configuration of a main body 610 of the computer system 600. As shown in FIG. 17, the computer system 600 includes the main body 610, a display 620 that displays information (e.g., image) on a display screen 621 based on instructions from the main body 610, a keyboard 630 that allows the user to input information to the computer system 600, and a mouse 640 that allows the user to designate an arbitrary position on the display screen 621 of the display 620.

As shown in FIG. 18, the main body 610 of the computer system 600 includes a CPU 611, a RAM 612, a ROM 613, a hard disk drive (HDD) 614, a CD-ROM drive 615 that receives a CD-ROM 660, a USB port 616 to which a USB memory 670 is removably connected, an I/O interface 617 that connects the display 620, the keyboard 630, and the mouse 640, and a LAN interface 618 that is used to connect to a local area network or a wide area network (LAN/WAN)N1.

The computer system 600 is connected to a modem 650 that is used to connect to a public line N3 (e.g., Internet). The computer system 600 is also connected to a personal computer (PC) 681 (i.e., another computer system), a server 682, a printer 683, and the like via the LAN interface 618 and the local area network or the large area network N1.

The computer system 600 implements the functions of the image processing device by reading an image processing program (e.g., an image processing program that implements the process described with reference to FIGS. 8, 9, and 13) recorded on a given recording medium, and executing the image processing program. The given recording medium may be an arbitrary recording medium that records the image processing program that can be read by the computer system 600, such as the CD-ROM 660, the USB memory 670, a portable physical medium (e.g., MO disk, DVD disk, flexible disk (FD), magnetooptical disk, or IC card), a stationary physical medium (e.g., HDD 614, RAM 612, or ROM 613) that is provided inside or outside the computer system 600, or a communication medium that temporarily stores a program during transmission (e.g., the public line N3 connected via the modem 650, or the local area network or the wide area network N1 to which the computer system (PC) 681 or the server 682 is connected).

Specifically, the image processing program is recorded on a recording medium (e.g., portable physical medium, stationary physical medium, or communication medium) so that the image processing program can be read by a computer. The computer system 600 implements the functions of the image processing device by reading the image processing program from such a recording medium, and executing the image processing program. Note that the image processing program need not necessarily be executed by the computer system 600. The invention may be similarly applied to the case where the computer system (PC) 681 or the server 682 executes the image processing program, or the computer system (PC) 681 and the server 682 execute the image processing program in cooperation.

This makes it possible to store image data, and process the stored image data by means of software using a computer system (e.g., PC) (e.g., capsule endoscope).

The above embodiments may also be applied to a computer program product that stores a program code that implements each section (e.g., preprocessing section, demosaicing section, blurring correction section, and post-processing section) according to the above embodiments.

The program code implements an image acquisition section that acquires images in time series, a coefficient calculation section that calculates a correction coefficient for correcting blurring in a depth direction that is a direction along an optical axis of an imaging section, and a depth-direction blurring correction section that performs a process that corrects blurring in the depth direction on the images based on the correction coefficient.

The term "computer program product" refers to an information storage medium, a device, an instrument, a system, or the like that stores a program code, such as an information storage medium (e.g., optical disk medium (e.g., DVD), hard disk medium, and memory medium) that stores a program code, a computer that stores a program code, or an Internet system (e.g., a system including a server and a client terminal), for example. In this case, each element and each process according to the above embodiments are implemented by corresponding modules, and a program code that includes these modules is recorded in the computer program product.

The embodiments according to the invention and modifications thereof have been described above. Note that the invention is not limited to the above embodiments and modifications thereof. Various modifications and variations may be made without departing from the scope of the invention. A plurality of elements disclosed in connection with the above embodiments and modifications thereof may be appropriately combined. For example, some of the elements disclosed in connection with the above embodiments and modifications thereof may be omitted. Some of the elements disclosed in connection with the above embodiments and modifications thereof may be appropriately combined. Specifically, various modifications and applications are possible without materially departing from the novel teachings and advantages of the invention.

Any term (e.g., image signal, endoscope apparatus, or optical axis direction) cited with a different term (e.g., image, endoscope system, or depth direction) having a broader meaning or the same meaning at least once in the specification and the drawings may be replaced by the different term in any place in the specification and the drawings.

What is claimed is:

1. An endoscope apparatus comprising:
   an image acquisition section that acquires images in time series;
   a coefficient calculation section that calculates a correction coefficient for correcting blurring in a depth direction that is a direction along an optical axis of an imaging section; and
   a depth-direction blurring correction section that performs a depth-direction blurring correction process on the images acquired in time series based on the correction coefficient, the depth-direction blurring correction process being a process that corrects blurring in the depth direction; wherein
   the image acquisition section acquiring a first image and a second image in time series, the second image being subsequent to the first image,
   the coefficient calculation section calculating the correction coefficient that corresponds to a magnification of the second image with respect to the first image, and
   the depth-direction blurring correction section performing the depth-direction blurring correction process by correcting a change in magnification of the images due to blurring in the depth direction based on the correction coefficient.

2. The endoscope apparatus as defined in claim 1, further comprising:
   a correction start detection section that detects a start timing of the depth-direction blurring correction process,
   the depth-direction blurring correction section starting the depth-direction blurring correction process when the correction start detection section has detected the start timing.

3. The endoscope apparatus as defined in claim 2, further comprising:
   a determination section that determines whether or not an amount of blurring in the depth direction after the depth-direction blurring correction process is within a given reference range; and
   a planar-direction blurring correction section that performs a planar-direction blurring correction process when the determination section has determined that the amount of blurring in the depth direction is within the given reference range, the planar-direction blurring correction process being a process that corrects planar-direction blurring that is blurring in a direction that perpendicularly intersects the optical axis.

4. An endoscope apparatus comprising:
   an image acquisition section that acquires images in time series;

a coefficient calculation section that calculates a correction coefficient for correcting blurring in a depth direction that is a direction along an optical axis of an imaging section; and a depth-direction blurring correction section that performs a depth-direction blurring correction process on the images acquired in time series based on the correction coefficient, the depth-direction blurring correction process being a process that corrects blurring in the depth direction; wherein the image acquisition section acquiring a first image and a second image in time series, the second image being subsequent to the first image, and the coefficient calculation section calculating a magnification of the second image with respect to the first image as the correction coefficient based on a ratio of an area of a region enclosed by feature points included in the first image and an area of a region enclosed by feature points included in the second image, the feature points included in the second image corresponding to the feature points included in the first image.

5. An endoscope apparatus comprising:
an image acquisition section that acquires images in time series;
a coefficient calculation section that calculates a correction coefficient for correcting blurring in a depth direction that is a direction along an optical axis of an imaging section; and
a depth-direction blurring correction section that performs a depth-direction blurring correction process on the images acquired in time series based on the correction coefficient, the depth-direction blurring correction process being a process that corrects blurring in the depth direction; wherein
the imaging section including an optical system that performs an autofocus process,
the coefficient calculation section calculating the correction coefficient based on an in-focus object plane position of the optical system adjusted by the autofocus process;
the image acquisition section acquiring a first image and a second image in time series, the second image being subsequent to the first image, and
the coefficient calculation section calculating a magnification of the second image with respect to the first image as the correction coefficient based on the in-focus object plane position when the first image is captured and the in-focus object plane position when the second image is captured.

6. An endoscope apparatus comprising:
an image acquisition section that acquires images in time series;
a coefficient calculation section that calculates a correction coefficient for correcting blurring in a depth direction that is a direction along an optical axis of an imaging section; and
a depth-direction blurring correction section that performs a depth-direction blurring correction process on the images acquired in time series based on the correction coefficient, the depth-direction blurring correction process being a process that corrects blurring in the depth direction; wherein
the depth-direction blurring correction section performing the depth-direction blurring correction process by enlarging or reducing an image among the images based on the correction coefficient;

the image acquisition section acquiring a first image and a second image in time series, the second image being subsequent to the first image,
the coefficient calculation section calculating a magnification of the second image with respect to the first image as the correction coefficient, and
the depth-direction blurring correction section enlarging or reducing the second image based on the correction coefficient.

7. An endoscope apparatus comprising:
an image acquisition section that acquires images in time series;
a coefficient calculation section that calculates a correction coefficient for correcting blurring in a depth direction that is a direction along an optical axis of an imaging section;
a depth-direction blurring correction section that performs a depth-direction blurring correction process on the images acquired in time series based on the correction coefficient, the depth-direction blurring correction process being a process that corrects blurring in the depth direction; and
a trimming section that performs a trimming process trimming an image having a given size from an image subjected to the depth-direction blurring correction process; wherein
the depth-direction blurring correction section performing the depth-direction blurring correction process by enlarging or reducing an image among the images based on the correction coefficient.

8. An endoscope apparatus comprising:
an image acquisition section that acquires images in time series;
a coefficient calculation section that calculates a correction coefficient for correcting blurring in a depth direction that is a direction along an optical axis of an imaging section;
a depth-direction blurring correction section that performs a depth-direction blurring correction process on the images acquired in time series based on the correction coefficient, the depth-direction blurring correction process being a process that corrects blurring in the depth direction;
a correction start detection section that detects a start timing of the depth-direction blurring correction process,
the correction start detection section determining whether or not to start the depth-direction blurring correction process based on motion information about an object included in the images, and
the depth-direction blurring correction section starting the depth-direction blurring correction process when the correction start detection section has determined to start the depth-direction blurring correction process.

9. The endoscope apparatus as defined in claim 8,
the image acquisition section acquiring a first image and a second image in time series, the second image being subsequent to the first image,
the correction start detection section calculating a motion amount that indicates an amount of blurring in the depth direction based on the motion information about the object included in the first image and the second image, and
the correction start detection section determining to start the depth-direction blurring correction process when the motion amount is larger than a threshold value.

10. An endoscope apparatus comprising:

an image acquisition section that acquires images in time series;

a coefficient calculation section that calculates a correction coefficient for correcting blurring in a depth direction that is a direction along an optical axis of an imaging section;

a depth-direction blurring correction section that performs a depth-direction blurring correction process on the images acquired in time series based on the correction coefficient, the depth-direction blurring correction process being a process that corrects blurring in the depth direction;

a correction start detection section that detects a start timing of the depth-direction blurring correction process, the imaging section including an optical system that performs an autofocus process, and the correction start detection section determining whether or not to start the depth-direction blurring correction process based on a state of the autofocus process.

11. The endoscope apparatus as defined in claim 10, the optical system performing an optical zoom process, the autofocus process being enabled in a magnifying observation mode, an optical zoom magnification in the magnifying observation mode being higher than an optical zoom magnification in a normal observation mode, and the correction start detection section determining to start the depth-direction blurring correction process when the autofocus process has been enabled.

12. An endoscope apparatus comprising:

an image acquisition section that acquires images in time series;

a coefficient calculation section that calculates a correction coefficient for correcting blurring in a depth direction that is a direction along an optical axis of an imaging section;

a depth-direction blurring correction section that performs a depth-direction blurring correction process on the images acquired in time series based on the correction coefficient, the depth-direction blurring correction process being a process that corrects blurring in the depth direction; and a correction start detection section that detects a start timing of the depth-direction blurring correction process, wherein the correction start detection section determining whether or not to start the depth-direction blurring correction process based on an external input.

13. An endoscope apparatus comprising:

an image acquisition section that acquires images in time series;

a coefficient calculation section that calculates a correction coefficient for correcting blurring in a depth direction that is a direction along an optical axis of an imaging section;

a depth-direction blurring correction section that performs a depth-direction blurring correction process on the images acquired in time series based on the correction coefficient, the depth-direction blurring correction process being a process that corrects blurring in the depth direction;

a determination section that determines whether or not an amount of blurring in the depth direction after the depth-direction blurring correction process is within a given reference range based on motion information about the images after the depth-direction blurring correction process; and a planar-direction blurring correction section that performs a planar-direction blurring correction process when the determination section has determined that the amount of blurring in the depth direction is within the given reference range, the planar-direction blurring correction process being a process that corrects planar-direction blurring that is blurring in a direction that perpendicularly intersects the optical axis.

14. The endoscope apparatus as defined in claim 13, the image acquisition section acquiring a first image and a second image in time series, the second image being subsequent to the first image, the determination section calculating a motion amount that indicates an amount of blurring in the depth direction based on the motion information after the depth-direction blurring correction process, the motion information being motion information between feature points included in the first image and feature points included in the second image, the feature points included in the second image corresponding to the feature points included in the first image, and the determination section determining to start the planar-direction blurring correction process when the motion amount is smaller than a threshold value.

15. The endoscope apparatus as defined in claim 13, the planar-direction blurring correction section performing the planar-direction blurring correction process by an electronic blurring correction process.

16. A non-transitory computer-readable medium storing a program that causes a computer to function as:

an image acquisition section that acquires images in time series;

a coefficient calculation section that calculates a correction coefficient for correcting blurring in a depth direction that is a direction along an optical axis of an imaging section; and a depth-direction blurring correction section that performs a depth-direction blurring correction process on the images acquired in time series based on the correction coefficient, the depth-direction blurring correction process being a process that corrects blurring in the depth direction; wherein the image acquisition section acquiring a first image and a second image in time series, the second image being subsequent to the first image, the coefficient calculation section calculating the correction coefficient that corresponds to a magnification of the second image with respect to the first image, and the depth-direction blurring correction section performing the depth-direction blurring correction process by correcting a change in magnification of the images due to blurring in the depth direction based on the correction coefficient.

* * * * *